United States Patent
Kitano et al.

(10) Patent No.: US 12,343,704 B2
(45) Date of Patent: Jul. 1, 2025

(54) METHOD OF PRODUCING METAL OXYHYDRIDE, METAL OXYHYDRIDE, AND METHOD OF SYNTHESIZING AMMONIA USING SAME

(71) Applicant: JAPAN SCIENCE AND TECHNOLOGY AGENCY, Kawaguchi (JP)

(72) Inventors: Masaaki Kitano, Machida (JP); Hideo Hosono, Yamato (JP); Toshiharu Yokoyama, Yokohama (JP); Kayato Ooya, Kamakura (JP); Kiya Ogasawara, Hadano (JP); Ryu Takashima, Yokohama (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 757 days.

(21) Appl. No.: 17/597,101

(22) PCT Filed: Jul. 1, 2020

(86) PCT No.: PCT/JP2020/025765
§ 371 (c)(1),
(2) Date: Dec. 27, 2021

(87) PCT Pub. No.: WO2021/006136
PCT Pub. Date: Jan. 14, 2021

(65) Prior Publication Data
US 2022/0241754 A1 Aug. 4, 2022

(30) Foreign Application Priority Data
Jul. 8, 2019 (JP) .................. 2019-127224

(51) Int. Cl.
*B01J 23/10* (2006.01)
*B01J 23/02* (2006.01)
(Continued)

(52) U.S. Cl.
CPC ............... *B01J 23/10* (2013.01); *B01J 23/02* (2013.01); *B01J 23/462* (2013.01); *B01J 23/745* (2013.01);
(Continued)

(58) Field of Classification Search
CPC . B01J 23/10; B01J 23/02; B01J 23/462; B01J 23/745; B01J 23/75; C01C 1/041; C01F 11/02; C01P 2002/72
(Continued)

(56) References Cited

U.S. PATENT DOCUMENTS 9,440,228 B2 * 9/2016 Hosono .................... B01J 23/02
2016/0089724 A1 3/2016 Adam et al.
2017/0088433 A1 * 3/2017 Kageyama ............. B01J 23/002

FOREIGN PATENT DOCUMENTS

CH 704 017 A2 4/2012
CN 105392734 A 3/2016
(Continued)

OTHER PUBLICATIONS

Matsui et. al. (Ambient pressure synthesis of La2LiHO3 as a solid electrolyte for a hydrogen electrochemical cell, J Am Ceram Soc. 2019;102:3228-3235; pub online Apr. 11, 2019 (Year: 2019).*
(Continued)

*Primary Examiner* — Sally A Merkling
*Assistant Examiner* — Gail Boardman
(74) *Attorney, Agent, or Firm* — Panitch Schwarze Belisario & Nadel LLP

(57) ABSTRACT

The invention provides a method of producing a metal oxyhydride, capable of synthesizing the metal oxyhydride
(Continued)

under reaction conditions close to atmospheric pressure, and excellent in productivity and cost. The method of producing a metal oxyhydride of the present invention includes reacting an oxide with a metal hydride in a hydrogen atmosphere. A non-oxygen element constituting the oxide comprises only one kind of non-oxygen element. A pressure condition of the reaction is 0.1 to 0.9 MPa, and a temperature of the reaction is 500 to 1000° C.

5 Claims, 8 Drawing Sheets

(51) Int. Cl.
    *B01J 23/46*    (2006.01)
    *B01J 23/745*   (2006.01)
    *B01J 23/75*    (2006.01)
    *C01C 1/04*    (2006.01)
    *C01F 11/02*   (2006.01)
    *C01F 17/32*   (2020.01)

(52) U.S. Cl.
    CPC ............ *B01J 23/75* (2013.01); *C01C 1/0411* (2013.01); *C01F 11/02* (2013.01); *C01F 17/32* (2020.01); *C01P 2002/72* (2013.01)

(58) Field of Classification Search
    USPC ........................................................ 423/363
    See application file for complete search history.

(56) References Cited

FOREIGN PATENT DOCUMENTS

| | | |
|---|---|---|
| JP | 2017098067 A | 6/2017 |
| WO | 2013008705 A1 | 1/2013 |
| WO | 2015136954 A1 | 9/2015 |

OTHER PUBLICATIONS

Takeiri et. al. ("Ba2ScHO3: H-Conductive Layered Oxyhydride with H-Site Selectivity", Inorg. Chem. 2019, 58, 4431-4436; published Feb. 20, 2019) (Year: 2019).*

Hernandez et. al. ("Site Selectivity of Hydride in Early-Transition-Metal Ruddlesden—Popper Oxyhydrides", Inorg. Chem. 2018, 57, 11058-11067 (Year: 2018).*

Office Action and Search Report issued Apr. 22, 2023, by the National Intellectual Property Administration, P. R. China in corresponding Chinese Patent Application No. 202080043703.6 and an English translation of the Search Report. (13 pages).

Besara et al., "Single crystal synthesis and magnetism of the BaLn2O4 family (Ln=lanthanide)", Progress in Solid State Chemistry, 2014, 42, 23-36, 45 pages.

International Search Report (PCT/ISA/210) with English translation, and Written Opinion (PCT/ISA/237) mailed on Sep. 1, 2020, by the Japanese Patent Office as the International Searching Authority for International Application No. PCT/JP2020/025765.

Kobayashi et al., "Titanium-Based Hydrides as Heterogeneous Catalysts for Ammonia Synthesis", J. Am. Chem. Soc. 2017, 139, pp. 18240-18246.

Tang et al., "Metal-Dependent Support Effects of Oxyhydride-Supported Ru, Fe, Co Catalysts for Ammonia Synthesis", Adv. Energy Mater. 2018, 1801772, 9 pages.

Yamashita et al., "Chemical Pressure-Induced Anion Order-Disorder Transition in LnHO Enabled by Hydride Size Flexibility", J. Am. Chem. Soc. 2018, 140, pp. 11170-11173.

Office Action (Notice of Reasons for Rejection) issued on Nov. 29, 2022, by the Japanese Patent Office in corresponding Japanese Patent Application No. 2021-530639, and an English translation of the Office Action. (6 pages).

\* cited by examiner

METHOD OF PRODUCING METAL OXYHYDRIDE, METAL OXYHYDRIDE, AND METHOD OF SYNTHESIZING AMMONIA USING SAME

BACKGROUND OF THE INVENTION

Field of the Invention

The present invention provides a method of producing a metal oxyhydride, a metal oxyhydride, and a method of synthesizing ammonia using the same.

Priority is claimed on Japanese Patent Application No. 2019-127224, filed Jul. 8, 2019, the content of which is incorporated herein by reference.

Description of Related Art

Among oxyhydrides having hydride ions (H⁻ ions) in the skeleton, LaFeAs $(O_{1-x}H_x)$ and $La_{2-x-y}Sr_{x+y}LiH_{1-x+y}O_{3-y}$, which show superconductivity and hydride ion conductivity, respectively, have been reported, and materials containing H⁻ ions have been attracting attention. Recently, it has been reported that catalysts prepared by combining oxyhydrides such as $BaTiO_{3-x}H_x$, $SrTiO_{3-x}H_x$, $CaTiO_{3-x}H_x$, and LnHO (Ln=Gd, Sm) with metal nanoparticles such as Ru exhibit high ammonia synthesis activity (Non-Patent Documents 1 to 3).

On the other hand, a method of synthesizing a $BaLn_2O_4$ (Ln=lanthanide) single crystal has been reported (e.g., Non-Patent Document 4).

PRIOR ART DOCUMENTS

Non-Patent Documents

[Non-Patent Document 1] Kageyama, et al. J. Am. Chem. Soc., 2017, 139, Pages 18240-18246.
[Non-Patent Document 2] Kageyama, et al. Adv. Energy Mater 2018, Pages 1801772.
[Non-Patent Document 3] Kageyama, et al. J. Am. Chem. Soc., 2018, 140, Pages 11170-11173.
[Non-Patent Document 4] Besara, et al. Progress in Solid State Chemistry, 2014, 42, Pages 23-36.

SUMMARY OF THE INVENTION

Problems to be Solved by the Invention

Although the oxyhydride disclosed in Non-Patent Documents 1 to 3 is a material of interest in various fields due to its unique properties derived from the H⁻ ion, due to the complexity of the synthetic method, there are not many kinds of synthesized oxyhydrides yet. Although Non-Patent Document 4 describes the magnetic properties of $BaLn_2O_4$, there is no disclosure regarding an oxyhydride obtained by replacing oxygen of $BaLn_2O_4$ with a hydride ion (H⁻ ion), and there is no disclosure in particular using the oxyhydride as a catalyst for ammonia synthesis.

Means for Solving Problems

The present inventors have found a method of producing a metal oxyhydride by reacting an oxide comprising only one kind of non-oxygen element with a metal hydride in a short time under a reaction condition close to atmospheric pressure.

That is, the gist of the present invention is as follows.

[1] A method of producing a metal oxyhydride by reacting an oxide with a metal hydride in a hydrogen atmosphere,
wherein a non-oxygen element constituting the oxide comprises only one type of non-oxygen element;
a pressure condition of the reaction is 0.1 to 0.9 MPa; and
a temperature of the reaction is 500 to 1000° C.

[2] The method according to [1],
wherein the metal oxyhydride comprises a metal element constituting the metal hydride, a non-oxygen element constituting the oxide, an oxygen, and a hydrogen; and
the metal element is different from the non-oxygen element.

[3] The method according to [1] or [2], the method comprising:
mixing the oxide with the metal hydride to obtain a mixture; and
heating the mixture in a hydrogen atmosphere at a pressure of 0.1 to 0.9 MPa and at a temperature of 500 to 1000° C.

[4] The method according to [3], further comprising a pretreatment step of dehydrating the oxide prior to the mixing step.

[5] The method according to any one of [1] to [4],
wherein the oxide is $M_mO_n$,
wherein M is the non-oxygen element and m is 1 or 2; n represents a number of 2 or 3), and
$M_mO_n$ is a kind selected from the group consisting of $Sc_2O_3$, $Y_2O_3$, $LnO_2$, $ZrO_2$, $TiO_2$, $SiO_2$, and $Al_2O_3$;
the metal hydride is $AeH_2$,
wherein Ae is an alkaline earth metal selected from the group consisting of Mg, Ca, Ba, and Sr; and
the metal oxyhydride is a metal oxyhydride represented by general formula (1),

wherein Ae is at least one alkaline earth metal selected from the group consisting of Mg, Ca, Ba, and Sr; M is a non-oxygen element selected from the group consisting of Sc, Y, Ln, Zr, Ti, Si, and Al; r is 1 or 2; p is 1 or 2; q is 3 or 4; x represents a number expressed by 0.1≤x≤3.0; and y represents a number expressed by 0.2≤y≤3.0.

[6] The method according to [5],
wherein the metal hydride is $BaH_2$, and
in the general formula (1), Ae is Ba.

[7] The method according to [5] or [6],
wherein a feed molar ratio of the oxide to the metal hydride is from p:0.5r to p:2.5r.

[8] A metal oxyhydride represented by general formula (1),

wherein in the general formula (1), Ae is at least one alkaline earth metal selected from the group consisting of Mg, Ca, Ba, and Sr; M is a non-oxygen element selected from the group consisting of Sc, Y, Ln, Zr, Ti, Si, and Al; r is 1 or 2; p is 1 or 2; q is 3 or 4; x represents a number expressed by 0.1≤x≤3.0; and y represents a number expressed by 0.2≤y≤3.0.

[9] The metal oxyhydride according to [1],
wherein in the general formula (1), Ae is Ba.

[10] The metal oxyhydride according to [8] or [9],
wherein the metal oxyhydride is represented by any one of formulae (2) to (6), $$AeLn_2O_{4-x}H_y \qquad (2)$$

$$Ae_2SiO_{4-x}H_y \qquad (3)$$

$$AeAl_2O_{4-x}H_y \qquad (4)$$

$$AeTiO_{3-x}H_y \qquad (5)$$

$$AeZrO_{3-x}H_y \qquad (6),$$

wherein in the above general formulae (2) to (6), Ae, x, and y are the same as Ae, x, and y in the above general formula (1).

[11] A metal-supported material, in which a transition metal is supported on a support,
wherein the support is a composition comprising the metal oxyhydride of any one of [8] to [10].

[12] The metal-supported material according to [11], wherein a loading amount of the transition metal is 0.01 parts by mass or more and 50 parts by mass or less with respect to 100 parts by mass of the support.

[13] The metal-supported material according to [11] or [12],
wherein the transition metal is at least one selected from the group consisting of Ru, Co, and Fe.

[14] A metal-supported catalyst comprising the metal-supported material of any one of claims [11] to [13].

[15] An ammonia synthesis catalyst comprising the metal-supported material of any one of [11] to [13].

[16] An ammonia synthesis catalyst, which is a composition comprising the metal oxyhydride of any one of [8] to [10].

[17] A method of synthesizing ammonia, comprising reacting nitrogen with hydrogen in the presence of the metal-supported catalyst of [14].

Effect of the Invention

The method of producing the metal oxyhydride of the present invention is suitable as a method of synthesizing the metal oxyhydride because the metal oxyhydride can be produced in a short time under reaction conditions close to atmospheric pressure. In comparison with a conventional method of synthesizing a metal oxyhydride, the metal oxyhydride can be synthesized under a reaction condition close to atmospheric pressure, and the method of the present invention is excellent in terms of productivity and cost.

When the obtained metal oxyhydride such as $BaCe_2O_{4-x}H_y$ is used as a catalyst for ammonia synthesis, it has a high ammonia synthesis activity even at a low reaction temperature and at a low reaction pressure, and the catalyst activity does not decrease even if the synthesis reaction is repeated. Therefore, the metal oxyhydride is suitable as a catalyst for ammonia synthesis.

DETAILED DESCRIPTION OF THE INVENTION

The present invention will now be described in detail.
(Method of Producing Metal Oxyhydride)

The method of producing the metal oxyhydride of the present invention comprises reacting an oxide with the metal hydride in a hydrogen atmosphere. A non-oxygen element constituting the oxide comprises only one kind of non-oxygen element. The pressure condition of the reaction is 0.1 to 0.9 MPa, and the temperature of the reaction is 500 to 1000° C.

The metal oxyhydride obtained by the producing method of the present invention includes a metal element constituting the metal hydride, the non-oxygen element constituting the oxide, oxygen, and hydrogen. It is preferable that the metal element and the non-oxygen element are different from each other.

The pressure condition of the reaction is preferably 0.1 to 0.4 MPa. The temperature of the reaction is preferably 600 to 800° C. The reaction time is preferably 0.5 to 24 hours. More preferably, the reaction time is 10 to 24 hours.

Figure 1:
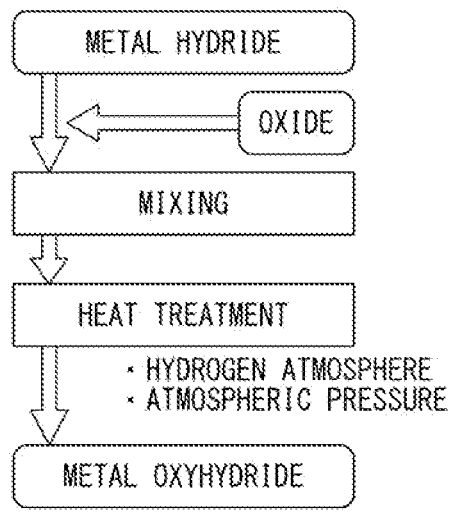
FIG. 1 illustrates a method of producing a metal oxyhydride according to an embodiment of the present invention.

As shown in FIG. 1, one embodiment of a method of producing a metal oxyhydride of the present invention preferably includes a step of mixing the oxide with the metal hydride to obtain a mixture, and a step of heating the mixture in a hydrogen atmosphere at a pressure of 0.1 to 0.9 MPa and at a temperature of 500 to 1000° C. Preferably, the pressure condition of the reaction is 0.1 to 0.4 MPa, the temperature of the reaction is 600 to 800° C., and the reaction time is 0.5 to 24 hours. More preferably, the reaction time is 10 to 24 hours.

The mixing step is preferably carried out in an inert gas atmosphere such as argon. The method of mixing is not particularly limited, but a method of mixing using an agate mortar, a method of mixing using a ball mill, and the like can be used. The oxide and the metal hydride used in the mixing step are preferably powder. For example, the average particle size of the oxide is preferably several nm to several μm. The average particle size of the metal hydride is preferably several tens nm to several μm.

The form of the raw material of the oxide and the metal hydride used is preferably powder. For example, when $CeO_2$ is an example of an oxide to be used, commercially available Aldrich $CeO_2$ powder (average particle size: less than 25 nm) is used. When $BaH_2$ is an example of the metal hydride used, it can be synthesized by the following procedure. $BaH_2$ can be obtained by a known synthesizing method such as heating, under a hydrogen atmosphere, a commercially available reagent, Ba metal (made by Aridrich, block shape).

In the mixing step, for example, when the final metal oxyhydride is represented by the following general formula (8) (i.e., r is 1 or 2; p is 1 or 2), the feed molar ratio of the non-oxygen element M to the metal X of the metal hydride is preferably in the range of p:0.5r (mol:mol) to p:2.5r (mol:mol). For example, it is preferable to be p:0.7r (mol:mol) to p:1.1r (mol:mol). It may be p:r (mol:mol) or p:0.8r (mol:mol).

$$X_rM_pO_{q-x}H_y \qquad (8)$$

For example, when the oxide and the metal hydride are $CeO_2$ and $BaH_2$, respectively, the molar ratio of Ce to Ba (Ce:Ba) is preferably 0.5:1.0 to 1.0:0.5 (mol/mol), more preferably 0.8:1.0 to 1.0:0.8, and still more preferably 0.95:1.0 to 1.0:0.95. That is, an excessive amount of the metal hydride $BaH_2$ is added to the metal oxyhydride $BaCe_2O_{4-x}H_y$ to be synthesized.

The addition of an excess amount of metal hydride may allow the synthesis reaction to proceed more rapidly at ambient pressure because of the excess hydrogen in the mixture.

On the other hand, for example, when the oxide and the metal hydride are $SiO_2$ and $BaH_2$, respectively, the molar ratio of Si to Ba (Si:Ba) is preferably 1.0:1.5 to 1.0:2.5 (mol/mol), more preferably 1.0:1.8 to 1.0:2.2, and still more preferably 1.0:1.95 to 1.0:2.05. That is, for the metal oxyhydride $Ba_2SiO_{4-x}H_y$ to be synthesized, the amount of the metal hydride $BaH_2$ is added in accordance with the molar ratio of Si to Ba (Si:Ba) in the metal oxyhydride.

The method preferably further includes a pretreatment step of dehydrating the oxide as a raw material to be mixed before the mixing step. As the dehydrating step, for example, a vacuum heat treatment at 300° C. or more and less than 900° C., preferably 400° C. or more and less than 800° C., and more preferably 500° C. or more and less than 700° C. can be used.

In the heating step, the mixture obtained in the mixing step is placed in a hydrogen atmosphere and is heated at 500 to 1000° C., preferably 600 to 800° C. The pressure in the heating process is close to normal pressure, i.e., 0.1 to 0.9 MPa, more preferably 0.1 to 0.7 MPa, and even more preferably 0.1 to 0.4 MPa.

The heating method is not particularly limited, but heating in a hydrogen stream is preferable. As the heat treatment, for example, a heat treatment at 500 to 1000° C., and preferably at 600 to 800° C. in a stream of hydrogen, can be used. The reaction end time can be determined, for example, from the XRD diffraction pattern (X-ray diffraction pattern) of the obtained powder. For example, the reaction time is preferably 0.5 to 24 hours, and more preferably 10 to 24 hours.

One feature of the present invention is that it is not necessary to heat at high pressure. Even under a pressure condition close to atmospheric pressure, the release of hydrogen in the mixture can be suppressed, and the metal oxyhydride of the present invention can be produced.

The reasons remain unclear. When a metal oxyhydride is directly synthesized by a metal hydrogenation reaction between an oxide of one transition metal and another metal hydride, the energy required is expected to be lower than when a metal oxyhydride is indirectly synthesized by introducing hydrogen into a complex oxide of a transition metal and another metal. In particular, it is believed that, in one embodiment, when an excess amount of metal hydride is added, there is an excess of hydrogen in the mixture, allowing the synthesis reaction to proceed at lower temperatures and for a shorter time at ambient pressure. Further, it is considered that the smaller the particle size of the oxide and the metal hydride used as the raw material, the more a solid phase reaction proceeds.

[Oxide]

The oxide of the producing method of the present invention is not particularly limited as long as the non-oxygen element constituting the oxide is one type of non-oxygen element. The oxide of the producing method of the present invention includes a transition metal oxide and a typical element oxide.

The oxide of the producing method of the present invention is preferably an oxide of a non-oxygen element M represented by general formula (9).

$$M_mO_n \qquad (9)$$

(In the above general formula (9), M represents at least one non-oxygen element selected from the group consisting of first to third transition metals and Group 12 to Group 14 typical elements; m is 1 or 2; and n is 1 to 5.)

Examples of the non-oxygen element M constituting the oxide of the producing method of the present invention include a transition metal containing a first transition metal, a second transition metal, and a third transition metal; and a typical element containing a Group 12 typical element, a Group 13 typical element, and a Group 14 typical element. Specific examples of the first transition metal include Sc (scandium), Ti (titanium), V (vanadium), Cr (chromium), Mn (manganese), Fe (iron), Co (cobalt), Ni (nickel), and Cu (copper). Specific examples of the second transition metal include Y (yttrium), Zr (zirconium), Nb (niobium), Mo (molybdenum), Tc (technetium), Ru (ruthenium), Rh (rhodium), Pd (palladium), and Ag (silver). Specific examples of third transition metal include Ln (lanthanoid), Hf (hafnium), Ta (tantalum), W (tungsten), Re (rhenium), Os (osmium), Ir (iridium), Pt (platinum), and Au (gold). Specific examples of the Group 12 typical element include Zn (zinc). Specific examples of the Group 13 typical element include Al (aluminum), Ga (gallium) and In (indium). Specific examples of the Group 14 typical element include Si (silicon), Ge (germanium), and Sn (tin).

Ln (lanthanoid) is La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), or Lu (lutetium).

The non-oxygen element M constituting the oxide of the producing method of the present invention is preferably Sc (scandium), Y (yttrium), Ln (lanthanoid), Ti (titanium), Zr (zirconium), Si (silicon), or Al (aluminum). Here, as the Ln (lanthanoid), La (lanthanoid), Ce (cerium), Pr (praseodymium) and Sm (samarium) are more preferable.

That is, the oxide $M_mO_n$ of the producing method of the present invention is preferably $Sc_2O_3$, $Y_2O_3$, $LnO_2$, $TiO_2$, $ZrO_2$, $SiO_2$, or $Al_2O_3$. Here, as the $LnO_2$, for example, $La_2O_3$, $CeO_2$, $PrO_2$, and $SmO_2$ are more preferable.

[Metal Hydride]

The metal hydride of the producing method of the present invention is preferably a hydride of a metal element X represented by general formula (10).

$$XH_n \tag{10}$$

(In the above general formula (10), X represents at least one kind selected from the group consisting of atoms of Group 1 of the periodic table, atoms of Group 2 of the periodic table, atoms of Group 3 of the periodic table, and lanthanoid atoms, and n represents a number expressed by $1 \le n \le 3$.)

In the above general formula (10), X represents at least one kind selected from the group consisting of atoms of Group 1 of the periodic table, atoms of Group 2 of the periodic table, atoms of Group 3 of the periodic table, and lanthanoid atoms.

The atom used for X is not particularly limited, but may contain one kind or two or more kinds of elements. When two or more kinds of elements are contained, atoms of the same group or lanthanoid atoms are preferably contained, though not particularly limited.

The atom of Group 2 of the periodic table (hereinafter, referred to as the atom of Group 2 and sometimes abbreviated as Ae) is not particularly limited, and is preferably Mg, Ca, Sr, or Ba, and more preferably Ba, Ca, or Sr, and still more preferably Ba because of its high activity when used as a catalyst for ammonia synthesis.

The atom of Group 3 of the periodic table (hereinafter, referred to as the atom of Group 3) is not particularly limited, but is preferably Y because it is an element having a larger abundance.

The lanthanoid atom is not particularly limited, and is preferably La, Ce, Pr, Nd, Sm, Eu, Pr, or Yb. This is because it is a more versatile material. It is more preferably La, Ce, Nd, or Sm because it is an element having a relatively larger abundance. And it is still more preferably La or Ce because of its high activity when used as a catalyst for ammonia synthesis.

If X is a lanthanoid atom, it may include a plurality of lanthanoid atoms, specifically, it may be a Misch Metal. Here, "Misch Metal" is a common name of an alloy containing a plurality of rare earth elements, and is generally known as an alloy containing a large amount of Ce as a component thereof.

Hereinafter, the atoms of Group 3 and the lanthanoid atoms may be collectively referred to as Re.

The X is preferably an atom of Group 2 or a lanthanoid atom. This is because the amount of the element is large and the activity when the metal-supported material is used as a metal-supported catalyst described later is high. More preferably, it is an atom of Group 2. This is due to the large abundance of these elements.

The X is preferably Ca, Mg, Sr, Ba, Y, or a lanthanoid atom, more preferably Ca, Mg, Sr, Ba, Y, La, Ce, Pr, Nd, Sm, Eu, Pr, or Yb, and still more preferably Ba or Sr.

In the general formula (4), n represents a numerical value of $1 \le n \le 3$.

When X is an atom of Group 1, n is preferably 1, though not particularly limited. The above-mentioned n is not particularly limited when X is a group 2 atom, but is preferably 2.

In the case where X is an atom of Group 3 or a lanthanoid atom, n usually represents any number from 2 to 3, and is preferably 2 or 3.

The Ae and the Re usually form an ion-bonded hydride. The hydrogen contained in the ion-bonded hydride exists as hydride ion ($H^-$ ion), and hydrogen ($H_2$) and hydroxide ion ($OH^-$) are formed by the contact of the hydrogen with water or acid.

As the hydride of Re (hereinafter, referred to as $ReH_n$), both of a dihydride which is a general hydride and a trihydride which is a high-density hydride are known. A high-density metal hydride having a value between the dihydride and the trihydride can then be formed. In the high-density metal hydride, the value between the two hydrides and the three hydrides can be continuously changed.

The aforementioned X may further contain an atom other than X, specifically, at least one kind of alkali metal atom, as long as the effect of the present invention is not impaired.

The metal hydride used in the present invention is not particularly limited, but a commercially available reagent or an industrial raw material may be used as it is, or a metal hydride obtained by synthesizing the corresponding metal by a known method such as heating the metal in a hydrogen atmosphere may be used.

[Metal Oxyhydride]

The metal oxyhydride of the producing method of the present invention is not particularly limited as long as it has hydride ions ($H^-$ ions) in the skeleton of the oxide. For example, a metal oxyhydride represented by general formula (8) may be used.

$$X_rM_pO_{q-x}H_y \tag{8}$$

In the above general formula (8), X is the same as X of the above metal hydride; M is the same as the non-oxygen element in the oxide; r is 1 or 2; p is 1 or 2; q is a positive number of 1 to 4; x represents a number expressed by $0.1 \le x \le 3.0$; and y represents a number expressed by $0.2 \le y \le 3.0$. x preferably represents a number expressed by $0.1 \le x/r \le 1.5$; and y preferably represents a number expressed by $0.1 \le y/r \le 1.5$. The molar ratio y/r of H to X is preferably $y/r \ge 0.1$, more preferably $y/r > 0.5$, and even more preferably $y/r \ge 1.0$.

One embodiment of the metal oxyhydride of the present invention includes, for example, a metal oxyhydride obtained by partially replacing an oxygen side of a complex oxide comprising a non-oxygen element (M) with a hydride ion ($H^-$ ion). A specific example thereof is, for example, a metal oxyhydride represented by general formula (1).

$$Ae_rM_pO_{q-x}H_y \tag{1}$$

In the general formula (1), Ae is at least one alkaline earth metal selected from the group consisting of Mg, Ca, Ba, and Sr; M is a non-oxygen element selected from the group consisting of Sc, Y, Ln, Zr, Ti, Si, and Al; r is 1 or 2; p is 1 or 2; q is a positive number of 3 or 4; x represents a number expressed by $0.1 \le x \le 3.0$; and y represents a number expressed by $0.2 \le y \le 3.0$. Further, x preferably represents a number expressed by 0.1 $x/r \le 1.5$; and y preferably represents a number expressed by $0.1 \le y/r \le 1.5$. The molar ratio y/r of H to Ae is preferably $y/r \ge 0.1$, more preferably $y/r \ge 0.5$, and still more preferably $y/r \ge 1.0$.

In the above general formula (1), M is preferably Ln, and r=1, p=2, and q=4. For example, the metal oxyhydride is represented by general formula (2).

$$AeLn_2O_{4-x}H_y \quad (2)$$

In the general formula (2), Ae, x, and y have the same meaning as in the general formula (1).

In the above general formula (2), preferably, Ae is Ba; Ln is Ce; x represents a number expressed by 0.1≤x≤2.0; and y represents a number expressed by 0.2≤y≤2.0. That is, the metal oxyhydride is represented by general formula (11). Further, x preferably represents a number expressed by 0.2≤x≤1.5; and y preferably represents a number expressed by 0.2≤y≤1.5.

$$BaCe_2O_{4-x}H_y \quad (11)$$

The metal oxyhydride of the present invention may be, for example, a metal oxyhydride obtained by partially replacing the oxygen side of a complex oxide comprising $SiO_2$, $Al_2O_3$, $TiO_2$, and $ZrO_2$ with hydride ions ($H^-$ ions). Specific examples include metal oxyhydrides represented by the following general formulae (3) to (6), respectively.

$$Ae_2SiO_{4-x}H_y \quad (3)$$

$$AeAl_2O_{4-x}H_y \quad (4)$$

$$AeTiO_{3-x}H_y \quad (5)$$

$$AeZrO_{3-x}H_y \quad (6)$$

In the above general formulae (3) to (6), Ae, x, and y have the same meaning as in the general formula (1).

In general formulae (4) to (6), x preferably represents a number expressed by 0.1≤x≤2.0; and y preferably represents a number expressed by 0.2≤y≤2.0. Further, x more preferably represents a number expressed by 0.1≤x≤1.5; and y more preferably represents a number expressed by 0.2≤y≤1.5.

The metal oxyhydride of the present invention may be, for example, a metal oxyhydride obtained by partially replacing an oxygen side of a complex oxide comprising vanadium oxide with a hydride ion ($H^-$ ion). A specific example thereof is, for example, a metal oxyhydride represented by the following general formula (12):

$$AeVO_{2-x}H_y \quad (12)$$

In the general formula (12), Ae is, for example, an alkaline earth metal such as Ca, Ba, or Sr. x represents a number expressed by 0.1≤x≤1.5; and y represents a number expressed by 0.2≤y≤2.0.

Specific examples of the metal oxyhydrides of the present invention include $BaLa_2O_{4-x}H_y$, $BaPr_2O_{4-x}H_y$, $BaSc_2O_{4-x}H_y$, $BaSm_2O_{4-x}H_y$, $BaY_2O_{4-x}H_y$, $CaSc_2O_{4-x}H_y$, $MgSc_2O_{4-x}H_y$, $SrCe_2O_{4-x}H_y$, $SrPr_2O_{4-x}H_y$, $SrY_2O_{4-x}H_y$, $KLaO_{2-x}H_y$, $KScO_{2-x}H_y$, $KYO_{2-x}H_y$, $LiLaO_{2-x}H_y$, $LiCeO_{2-x}H_y$, $LiScO_{2-x}H_y$, $LiYO_{2-x}H_y$, $NaScO_{2-x}H_y$, $NaYO_{2-x}H_y$, $Ba_2SiO_{4-x}H_y$, $BaAl_2O_{4-x}H_y$, $BaTiO_{3-x}H_y$, $BaZrO_{3-x}H_y$, $SrZrO_{3-x}H_y$, and the like. In the above specific examples, x and y have the same meanings as in the general formula (1).

The amount of the hydride ion ($H^-$ ion) contained in the metal oxyhydride of the present invention is not particularly limited. When the metal oxyhydride is a metal oxyhydride represented by the general formula (8), the crystal structure of the metal oxyhydride preferably maintains the crystal structure of a complex oxide represented by general formula (13) which does not contain hydride ions.

$$X_rM_pO_q \quad (13)$$

In the general formula (13), X, M, r, p, and q have the same meanings as in general formula (8).

For example, in the case of the metal oxyhydride $BaCe_2O_{4-x}H_y$, the crystal structure of $BaCe_2O_4$ is preferably maintained.

The relationship between x and y of the metal oxyhydride represented by the general formula (8) is preferably x=(y/2)+σ so that the metal oxyhydride is charge neutral. When the valence of the transition metal M is constant, σ=0 is preferable. When the valence of some of the transition metals M changes, σ represents a number expressed by, for example, −0.5≤σ≤+0.5 in order to maintain charge neutrality.

That is, the general formulae (8), (1), (2) to (6), (11), and (12) may be the following general formulae (8A), (1A), (2A) to (6A), (11 A), and (12 A), respectively.

$$X_rM_pO_{q-(y/2)-\sigma}H_y \quad (8A)$$

$$Ae_rM_pO_{q-(y/2)-\sigma}H_y \quad (1A)$$

$$AeLn_2O_{4-(y/2)-\sigma}H_y \quad (2A)$$

$$Ae_2SiO_{4-(y/2)-\sigma}H_y \quad (3A)$$

$$AeAl_2O_{4-(y/2)-\sigma}H_y \quad (4A)$$

$$AeTiO_{3-(y/2)-\sigma}H_y \quad (5A)$$

$$AeZrO_{3-(y/2)-\sigma}H_y \quad (6A)$$

$$BaCe_2O_{4-(y/2)-\sigma}H_y \quad (11A)$$

$$AeVO_{2-(y/2)-\sigma}H_y \quad (12A)$$

In the above formulae, X, M, Ae, r, p, q, and y have the same meanings as those of general formulae (8), (1), (2) to (6), (11), and (12); and σ represents a number expressed by −0.5≤σ≤+0.5. σ preferably represents a number expressed by −0.25≤σ≤+0.25.

For example, in Example 1 described later, metal oxyhydrides represented by $BaCe_2O_{3.33}H_{1.34}$ (600° C.) and $BaCe_2O_{3.62}H_{0.76}$ (800° C.) (provided that the oxidation number of all Ce is set to trivalent) were synthesized. If the oxidation number of Ce is considered to change, these metal oxyhydrides can be represented by $BaCe_2O_{3.33-\sigma}H_{1.34}$ and $BaCe_2O_{3.62-\sigma}H_{0.76}$, respectively (σ has the same meaning as that in the above general formula). In Example 8 described later, a metal oxyhydride represented by $Ba_2SiO_2H_{2.68}e_{1.32}$ was synthesized (provided that the value of oxygen is considered to be at most 2 and the presence of electrons is at the anion site). If the oxidation number of Si is considered to change, these metal oxyhydrides can be represented by $Ba_2SiO_{2.66-\delta}H_{2.68}$ (σ has the same meaning as that in the above general formula).

In Example 9 described later, a metal oxyhydride represented by $BaAl_2O_3H_{0.22}e_{1.78}$ was synthesized (provided that the value of oxygen is considered to be up to 3 and the presence of electrons is at the anion site). If the oxidation number of Al is considered to change, these metal oxyhydrides can be represented by $BaAl_2O_{3.89-\delta}H_{0.22}$ (σ has the same meaning as that in the above general formula).

In Example 10 described later, a metal oxyhydride represented by $BaTiO_2H_{1.33}$ was synthesized (provided that the value of oxygen is considered to be at most 2 and the presence of electrons is at the anion site). If the oxidation number of Ti is considered to change, these metal oxyhydrides can be represented by $BaTiO_{2.33-\delta}H_{1.33}$ (σ has the same meaning as that in the above general formula).

In Example 11 described later, a metal oxyhydride represented by $BaZrO_2H_{1.62}e_{0.38}$ was synthesized (provided that the value of oxygen is considered to be at most 2 and the presence of electrons is at the anion site). If the oxidation number of Zr is considered to change, these metal oxyhydrides can be represented by $BaZrO_{2.19-\sigma}H_{1.62}$ (σ has the same meaning as that in the above general formula).

In Example 12 described later, a metal oxyhydride represented by $SrZrO_2H_{1.86}e_{0.13}$ was synthesized (provided that the value of oxygen is considered to be at most 2 and the presence of electrons is at the anion site). When the oxidation number of Zr is considered to change, these metal oxyhydrides can be expressed by $SrZrO_{2.07-\sigma}H_{1.86}$ (σ has the same meaning as that in the above general formula).

<Determination of Hydride Ions (H⁻ Ions) in Metal Oxyhydrides>

The amount of desorbed hydrogen can be obtained by analyzing the synthesized metal oxyhydride via a temperature programmed desorption analyzer (BELCATA). The ratio of hydride ions (H⁻ ions) contained in the metal oxyhydride is obtained based on the result of the amount of hydrogen desorbed. For example, in a later embodiment, based on the results analyzed by a thermal desorption analyzer (BELCATA) (FIG. 6), $BaCe_2O_{4-x}H_y$ synthesized at 600° C. can be represented by $BaCe_2O_{3.33}H_{1.34}$ (the oxidation number of all Ce is set to trivalent), and $BaCe_2O_{4-x}H_y$ synthesized at 800° C. can be represented as $BaCe_2O_{3.62}H_{0.76}$ (the oxidation number of all Ce is set to trivalent).

(Metal-Supported Material)

The metal-supported material of the present invention is formed by supporting a transition metal on a support.

The support is a composition containing the metal oxyhydride of the present invention. A metal-supported material of an embodiment of the present invention (hereinafter, it may also be referred to as a metal-supported material of the present embodiment) is formed by supporting a transition metal on a support. The support is preferably a metal oxyhydride represented by general formula (1).

$$Ae_rM_pO_{q-x}H_y \quad (1)$$

In the general formula (1), Ae is at least one alkaline earth metal selected from the group consisting of Mg, Ca, Ba, and Sr; M is a non-oxygen element selected from the group consisting of Sc, Y, Ln, Zr, Ti, Si, and Al; r is 1 or 2; p is 1 or 2; q is a positive number of 3 or 4; x represents a number expressed by 0.1≤x≤3.0; and y represents a number expressed by 0.2≤y≤3.0. Further, x preferably represents a number expressed by 0.1≤x/r≤1.5; and y preferably represents a number expressed by 0.1≤y/r≤1.5. The molar ratio y/r of H to Ae is preferably y/r≥0.1, more preferably y/r>0.5, and still more preferably y/r≥1.0.

In the above general formula (1), M is preferably Ln, and r=1, p=2, and q=4. The support is preferably, for example, a metal oxyhydride represented by general formula (2).

$$AeLn_2O_{4-x}H_y \quad (2)$$

In the general formula (2), Ae, x, and y have the same meaning as in the general formula (1).

In the above general formula (2), preferably, Ae is Ba; Ln is Ce; x represents a number expressed by 0.1≤x≤2.0; and y represents a number expressed by 0.2≤y≤2.0. That is, the metal oxyhydride is represented by general formula (11). Further, x preferably represents a number expressed by 0.2≤x≤1.5; and y preferably represents a number expressed by 0.2≤y≤1.5.

$$BaCe_2O_{4-x}H_y \quad (11)$$

The metal oxyhydride of the present invention may be, for example, a metal oxyhydride obtained by partially replacing the oxygen side of a complex oxide comprising $SiO_2$, $Al_2O_3$, $TiO_2$, and $ZrO_2$ with hydride ions (H⁻ ions). Specific examples include metal oxyhydrides represented by the following general formulae (3) to (6), respectively.

$$Ae_2SiO_{4-x}H_y \quad (3)$$

$$AeAl_2O_{4-x}H_y \quad (4)$$

$$AeTiO_{3-x}H_y \quad (5)$$

$$AeZrO_{3-x}H_y \quad (6)$$

In the above general formulae (3) to (6), Ae, x, and y have the same meaning as in the general formula (1).

In general formulae (4) to (6), x preferably represents a number expressed by 0.1≤x≤2.0; and y preferably represents a number expressed by 0.2≤y≤2.0. Further, x more preferably represents a number expressed by 0.1≤x≤1.5; and y more preferably represents a number expressed by 0.2≤y≤1.5.

The loading amount of the transition metal of the metal-supported material of the present invention is not particularly limited, but is preferably 0.01 parts by mass or more and 50 parts by mass or less with respect to 100 parts by mass of the support.

The loading amount of the transition metal of the metal-supported material of the present invention is not particularly limited, but is usually 0.5% by weight or more, preferably 1% by weight or more, more preferably 2% by weight or more, usually 30% by weight or less, preferably 20% by weight or less, and more preferably 10% by weight or less, with respect to the total amount of the catalyst. When the value is equal to or larger than the lower limit value, the effect of the present invention is obtained, and when the value is equal to or smaller than the upper limit value, the effect of the present invention is obtained in which the loading amount and the cost are matched.

The metal-supported material of the present embodiment is formed by supporting a transition metal on a support. The support is preferably a composition containing the metal oxyhydride obtained by heating the oxide and the metal hydride under a hydrogen atmosphere. More preferably, the composition contains a metal oxyhydride obtained by a producing method including a mixing step of mixing the oxide with the metal hydride and a heat treatment step of heat-treating the mixture obtained by the mixing step in a hydrogen atmosphere. The method preferably further includes a pretreatment step of dehydrating the oxide before the mixing step. In this case, in the mixing step, the dehydrated oxide and the metal hydride are preferably mixed in a rare gas atmosphere such as in an Ar glove box. In addition, the preferable heat treatment temperature, the preferable heating time, the preferable feed amount ratio of the raw material, and the like are the same as in the method of producing the metal oxyhydride of the present invention.

<Transition Metal>

The transition metal of the metal-supported material of the present invention is not particularly limited, but transition metals from Groups 6, 7, 8, 9, or 10 of the periodic table may be used, preferably those from Groups 6, 8, or 9 may be used, and more preferably those from Groups 8 or 9 may be used.

The specific metal element is not particularly limited, but Cr, Mo, Mn, Re, Fe, Ru, Os, Co, Rh, Ni, Pd, or Pt may be used. Mo, Re, Fe, Ru, Os, or Co may be preferably used in view of high bonding energy with nitrogen. Ru, Co, or Fe may be more preferably used in view of catalytic activity on synthesizing ammonia when a supported metal material is used as a supported metal catalyst. Further, Ru may be most preferably used in view of the highest catalytic activity.

Each of the above elements may be used alone, or two or more of them may be used in combination. Intermetallic compounds of these elements such as $Co_3Mo_3N$, $Fe_3Mo_3N$, $Ni_2Mo_3N$, $Mo_2N$, and the like may also be used. Each element may be used alone or in combination of two or more kinds; and preferably, each element may be used alone in view of cost.

<Method of Supporting Transition Metal in Metal Oxyhydride>

The method of supporting the transition metal on the metal oxyhydride is not particularly limited, but for example, the powdery metal oxyhydride obtained by the above method (for example, $BaCe_2O_{4-x}H_y$) and the compound of the metal to be supported are inserted into a silica glass tube, and the mixture is heated to 200° C. in a stream of hydrogen and nitrogen ($N_2:H_2=1:3$, flow rate: 8 ml/min) for 2 hours. Thereafter, by continuously raising the temperature to 400° C. for 2 hours and then heating the mixture at 400° C. for 2 hours, a metal-supported material in which the transition metal Me (for example, Ru) is fixed to the powdery metal oxyhydride (hereinafter, Me/metal oxyhydride, for example, $Ru/BaCe_2O_{4-x}H_y$) can be obtained.

For example, by using transition metal compounds $Ru_3(CO)_{12}$, $Co_2(CO)_8$, and $Fe_2(CO)_9$ in which the transition metals are Ru, Co, and Fe, the following metal-supported materials such as Ru-supported $BaCe_2O_{4-x}H_y$ (abbreviated as $Ru/BaCe_2O_{4-x}H_y$), Co-supported $BaCe_2O_{4-x}H_y$ (abbreviated as $Co/BaCe_2O_{4-x}H_y$), Fe-supported $BaCe_2O_{4-x}H_y$ (abbreviated as $Fe/BaCe_2O_{4-x}H_y$), Ru-supported $Ba_2SiO_{4-x}H_y$ (abbreviated as $Ru/Ba_2SiO_{4-x}H_y$), Ru-supported $BaAl_2O_{4-x}H_y$ (abbreviated as $Ru/BaAl_2O_{4-x}H_y$), Ru-supported $BaTiO_{3-x}H_y$ (abbreviated as $Ru/TiO_{3-x}H_y$), Ru-supported $BaZrO_{3-x}H_y$ (abbreviated as $Ru/BaZrO_{3-x}H_y$), Ru-supported $SrZrO_{3-x}H_y$ (abbreviated as $Ru/SrZrO_{3-x}H_y$), or the like can be synthesized.

<Form of Metal-Supported Material>

The form, such as lump, powder, coating, etc., of the metal-supported material of the present embodiment is not particularly limited but it is preferably powder. The particle size of the supported metal material powder is not particularly limited, but it may be 1 nm or less and 10 μm or more.

The particle diameter of the transition metal in the catalyst for ammonia synthesis of the present embodiment is not particularly limited, but it may be 1 nm or more and 100 nm or less. It is preferably 20 nm or less, and more preferably 10 nm or less in view of increasing the number of step sites, which is the active point of nitrogen dissociation when the supported metal material is used as a catalyst for ammonia synthesis.

(Metal-Supported Catalyst)

The metal-supported catalyst of the present embodiment is made of the metal-supported material. The metal-supported catalyst of the present embodiment includes a transition metal and a support for supporting the transition metal, and the support is the above-mentioned metal oxyhydride. For example, the support is preferably a metal oxyhydride represented by general formula (1).

In the general formula (1), Ae is at least one alkaline earth metal selected from the group consisting of Mg, Ca, Ba, and Sr; M is a non-oxygen element selected from the group consisting of Sc, Y, Ln, Zr, Ti, Si, and Al; r is 1 or 2; p is 1 or 2; q is a positive number of 3 or 4; x represents a number expressed by 0.1≤x≤3.0; and y represents a number expressed by 0.2≤y≤3.0. Further, x preferably represents a number expressed by 0.1≤x/r≤1.5; and y preferably represents a number expressed by 0.1≤y/r≤1.5. The molar ratio y/r of H to Ae is preferably y/r≥0.1, more preferably y/r>0.5, and still more preferably y/r≥1.0.

(Ammonia Synthesis Catalyst)

The ammonia synthesis catalyst of the present invention is obtained by supporting a transition metal on a support. The ammonia synthesis catalyst of the present embodiment includes a transition metal and a support for supporting the transition metal. The support is preferably a composition containing the metal oxyhydride described above. For example, the support is preferably a composition containing a metal oxyhydride represented by general formula (1).

In the general formula (1), Ae is at least one alkaline earth metal selected from the group consisting of Mg, Ca, Ba, and Sr; M is a non-oxygen element selected from the group consisting of Sc, Y, Ln, Zr, Ti, Si, and Al; r is 1 or 2; p is 1 or 2; q is a positive number of 3 or 4; x represents a number expressed by 0.1≤x≤3.0; and y represents a number expressed by 0.2≤y≤3.0. Further, x preferably represents a number expressed by 0.1≤x/r≤1.5; and y preferably represents a number expressed by 0.1≤y/r≤1.5. The molar ratio y/r of H to Ae is preferably y/r≥0.1, more preferably y/r>0.5, and still more preferably y/r≥1.0.

<Transition Metal>

The transition metal used in the present embodiment is not particularly limited, but transition metals from Groups 6, 7, 8, 9, or 10 of the periodic table may be used, preferably those from Groups 6, 8, or 9 may be used, and more preferably those from Groups 8 or 9 may be used.

The specific metal element is not particularly limited, but Cr, Mo, Mn, Re, Fe, Ru, Os, Co, Rh, Ni, Pd, or Pt may be used. Mo, Re, Fe, Ru, Os, or Co may be preferably used in view of high bonding energy with nitrogen. Ru, Co, or Fe may be more preferably used in view of catalytic activity on synthesizing ammonia when the supported metal material is used as a supported metal catalyst. Further, Ru may be most preferably used in view of the highest catalytic activity.

Each of the above elements may be used alone, or two or more of them may be used in combination. Intermetallic compounds of these elements such as $Co_3Mo_3N$, $Fe_3Mo_3N$, $Ni_2Mo_3N$, $Mo_2N$, and the like may also be used. Each element may be used alone or in combination of two or more kinds; and preferably, each element may be used alone in view of cost.

(Method of Producing Ammonia Synthesis Catalyst)

The ammonia synthesis catalyst of the present invention is obtained by supporting a transition metal on a support. The support is a composition containing the above-mentioned metal oxyhydride of the present invention. The catalyst for ammonia synthesis of the present embodiment is produced by supporting the transition metal on the support containing the composition containing the metal oxyhydride. The producing method is not particularly limited, but the support is usually made to carry a transition metal or a compound to be a precursor of the transition metal (hereinafter, the transition metal compound).

The composition of the metal oxyhydride used as the raw material for the ammonia synthesis catalyst of the present embodiment may use a commercially available reagent or an industrial raw material as it is, or may use a composition obtained by synthesizing from the corresponding metal via a known method.

The metal oxyhydride composition used in the present embodiment may be subjected to a pretreatment for heating in a hydrogen atmosphere at about 200 to 500° C. for several hours, for example, at 340° C. for 2 hours, and then the transition metal may be supported on the pretreated metal oxyhydride composition in a transition metal loading step described later.

Regarding the catalyst produced by using the sample previously heated under the hydrogen atmosphere of the support, for example, when used for the ammonia synthesis reaction, high activity is obtained immediately after the start of the reaction.

The method of loading the transition metal on the support used in the present embodiment is not particularly limited, but a known method can be used. Generally, a method is used in which a transition metal compound is supported on the support and then the transition metal compound is converted into a transition metal, wherein the transition metal compound is a compound of a supported transition metal and can be converted into a transition metal by reduction, thermal decomposition, or the like.

The transition metal compound is not particularly limited, but an inorganic compound or an organic transition metal complex of a transition metal easily susceptible to thermal decomposition or the like may be used. Specifically, a complex of transition metal, an oxide of transition metal, a transition metal salt such as a nitrate and a hydrochloride, or the like may be used.

For example, as a Ru compound, triruthenium dodecacarbonyl $[Ru_3(CO)_{12}]$, dichloro tetrakis (triphenylphosphine) ruthenium (II) $[RuCl_2(PPh_3)_4]$, dichloro-tris (triphenylphosphine) ruthenium (II) $[RuCl_2(PPh_3)_3]$, tris (acetylacetonato) ruthenium (III) $[Ru(acac)_3]$, ruthenocene $[Ru(C_5H_5)]$, nitrosyl ruthenium nitrate $[Ru(NO)(NO_3)_3]$, potassium ruthenate, ruthenium oxide, ruthenium nitrate, ruthenium chloride, or the like may be used. Tris (acetylacetonato) ruthenium (III) $[Ru(acac)_3]$ is preferable.

As an Fe compound, iron pentacarbonyl $[Fe(CO)_5]$, dodecacarbonyl ferric $[Fe_3(CO)_{12}]$, nona carbonyl iron $[Fe_2(CO)_9]$, tetracarbonyl iron iodide $[Fe(CO)_4I_2]$, tris (acetylacetonato) iron(III) $[Fe(acac)_3]$, ferrocene $[Fe(C_5H_5)_2]$, iron oxide, iron nitrate, iron chloride ($FeCl_3$, etc.), or the like may be used.

As a Co compound, cobalt octacarbonyl $[Co_2(CO)_8]$, tris (acetylacetonato) cobalt (III) $[Co(acac)_3]$, cobalt (II) acetylacetonate $[Co(acac)_2]$, cobaltocene $[Co(C_5H_5)_2]$, cobalt oxide, cobalt nitrate, cobalt chloride, or the like may be used.

A carbonyl complex of transition metal such as $[Ru_3(CO)_{12}]$, $[Fe(CO)_5]$, $[Fe_3(CO)_{12}]$, $[Fe_2(CO)_9]$, or $[Co_2(CO)_8]$ among these transition metal compounds is preferable in view that the reduction treatment to be described later can be omitted in the production of the supported metal material of the present embodiment because the transition metal may be loaded by loading the carbonyl complex and then heating it.

The loading amount of the transition metal compound to be used is not particularly limited, and an amount for realizing a desired loading amount can be suitably used, but normally, the amount is usually 2% by weight or more, preferably 10% by weight or more, more preferably 20% by weight or more, usually 50% by weight or less, preferably 40% by weight or less, and more preferably 30% by weight or less with respect to the weight of the support to be used.

As the method of loading the transition metal compound on the support, for example, a physical mixing method, a CVD method (chemical vapor deposition method), a sputtering method, or the like can be used.

In the physical mixing method, the support and the transition metal compound are mixed in a solid state and then heated in an inert gas stream, such as nitrogen, argon, or helium, or under vacuum. A heating temperature at this time is not particularly limited, but is usually 200° C. or higher and 600° C. or lower. A heating time is not particularly limited, but usually 2 hours or more is desirable.

When a transition metal compound which may be converted to a transition metal by thermal decomposition is used, at this stage, a transition metal is loaded and it becomes the supported metal material of the present embodiment.

In the case of using a transition metal compound other than the above-mentioned transition metal compound which may be converted to a transition metal by thermal decomposition, a transition metal compound may be reduced to obtain the supported metal material of the present embodiment.

A method of reducing the transition metal compound (hereinafter, referred to as "reduction treatment") is not particularly limited as long as it does not inhibit the object of the present invention, and examples thereof include a method in which the transition metal compound is reduced in a gas atmosphere containing a reducing gas, and a method in which a reducing agent such as $NaBH_4$, $NH_2NH_2$, or formalin is added to the solution of the transition metal compound to precipitate the transition metal on the surface of the metal hydride. However, the method in which the transition metal compound is reduced in a gas atmosphere containing a reducing gas is preferable. Examples of the reducing gas include hydrogen, ammonia, methanol (vapor), ethanol (vapor), methane, ethane, and the like.

During the reduction treatment, a component other than the reducing gas which does not inhibit the object of the present invention, particularly the ammonia synthesis reaction, may coexist with the reaction system. Specifically, at the time of the reduction treatment, in addition to the reducing gas such as hydrogen, a gas such as argon or nitrogen which does not inhibit the reaction may be allowed to coexist, and nitrogen is preferably allowed to coexist.

When the reduction treatment is carried out in a gas containing hydrogen, it can be carried out in parallel with the production of ammonia to be described later by allowing nitrogen to coexist with hydrogen. That is, when the supported metal material of the present embodiment is used as a catalyst for ammonia synthesis described later, by placing the transition metal compound supported on the metal hydride in the reaction conditions of the ammonia synthesis reaction, the transition metal compound may be reduced and converted to the transition metal.

The temperature during the reduction treatment is not particularly limited, and it may be 200° C. or higher, and is preferably 300° C. or higher. More preferably, the temperature is set to less than 700° C. Even more preferably, the temperature is from 400° C. to less than 700° C. When the reduction treatment is carried out within the above reduction treatment temperature range, the growth of the transition metal occurs sufficiently and within a preferable temperature range.

A pressure during the reduction treatment is not particularly limited, but it may be 0.01 to 10 MPa. When the pressure during the reduction treatment is set to the same condition as the ammonia synthesis condition described later, since complicated operations are unnecessary, the pressure range is preferable in view of production efficiency.

A time of the reduction treatment is not particularly limited, but in the case where the reduction treatment is carried out under normal pressure, it may be 1 hour or more, and is preferably 2 hours or more.

When the reaction is carried out at a high reaction pressure, for example, at 1 MPa or more, it is preferable that the reaction is carried out for 1 hour or more.

When a transition metal compound other than a transition metal compound converted to a transition metal by thermal decomposition is used, the transition metal compound contained in the solid mixture is reduced by a normal method, as in the aforementioned reduction treatment method, thereby providing the catalyst for ammonia synthesis of the present embodiment.

As components other than the metal oxyhydride and the transition metal, the support of the metal oxyhydride may further contain $SiO_2$, $Al_2O_3$, $ZrO_2$, MgO, activated carbon, graphite, SiC, or the like.

The catalyst for ammonia synthesis of the present embodiment can be used as a molded body using a conventional molding technique. As a shape of the catalyst, for example, a shape such as granular, spherical, tablet, ring, macaroni, four leaves, dice, honeycomb, and the like can be used. It can also be used after coating a suitable support.

When the catalyst for ammonia synthesis of the present embodiment is used, the reaction activity is not particularly limited, but when the formation rate of ammonia at a reaction temperature of 300° C. and at a reaction pressure of 0.9 MPa is taken as an example, the reaction activity is preferably 1.0 mmol $g^{-1}$ $h^{-1}$ or more, more preferably 2.0 mmol $g^{-1}$ $h^{-1}$ or more because it is suitable for practical production conditions, still more preferably 3.0 mmol $g^{-1}$ $h^{-1}$ or more because it is suitable for high-efficiency production conditions, and most preferably 5.0 mmol $g^{-1}$ $h^{-1}$ or more because it is more suitable for high-efficiency production conditions.

A method of producing ammonia using the ammonia synthesis catalyst of the present embodiment will be described below.

(Method of Producing Ammonia (Method of Synthesizing Ammonia)

The method of producing ammonia of the present embodiment (hereinafter, may be referred to as the producing method of the present embodiment) is a method for reacting nitrogen with hydrogen in the presence of the metal-supported catalyst of the present embodiment. That is, the metal-supported catalyst of the present embodiment or the ammonia synthesis catalyst of the present embodiment are used as a catalyst, and hydrogen and nitrogen are reacted on the catalyst to synthesize ammonia.

A specific producing method is not particularly limited, and ammonia can be appropriately produced according to a known producing method, as long as ammonia is synthesized by bringing hydrogen and nitrogen into contact with each other on the catalyst.

In the method of synthesizing ammonia of the present embodiment, usually, when hydrogen and nitrogen are brought into contact with each other on the catalyst, the catalyst is heated to produce ammonia.

The reaction temperature in the producing method of the present embodiment is not particularly limited, but is usually 200° C. or higher, preferably 250° C. or higher, more preferably 300° C. or higher, usually 600° C. or lower, preferably 500° C. or lower, and more preferably 450° C. or lower. Since ammonia synthesis is an exothermic reaction, although a lower temperature range is chemically advantageous for ammonia synthesis, it is preferable to carry out the reaction in the above temperature range in order to obtain a sufficient ammonia formation rate.

In the producing method of the present embodiment, the molar ratio of nitrogen and hydrogen brought into contact with the catalyst is not particularly limited, but usually the ratio of hydrogen to nitrogen ($H_2/N_2$ (volume/volume)) is 0.4 or more, preferably 0.5 or more, more preferably 1 or more, usually 10 or less, and preferably 5 or less.

The reaction pressure in the producing method of the present embodiment is not particularly limited, but is usually 0.01 MPa or more, preferably 0.1 MPa or more, usually 20 MPa or less, preferably 15 MPa or less, and more preferably 10 MPa or less at the pressure of the mixed gas containing nitrogen and hydrogen. For practical use, the reaction is preferably carried out under a pressurized condition of atmospheric pressure or higher.

In the producing method of the present embodiment, it is preferable to remove moisture or oxide adhering to the catalyst by using a dehydrating material, a cryogenic separation method, or hydrogen gas before bringing nitrogen and hydrogen into contact with the catalyst. The removal method includes reduction treatment.

In the producing method of the present embodiment, in order to obtain a better ammonia yield, it is not particularly limited but the water content in nitrogen and the water content in hydrogen used in the producing method of the present embodiment are preferably small, and the total water content in the mixed gas of nitrogen and hydrogen is usually preferably 100 ppm or less, and is preferably 50 ppm or less.

In the producing method of the present embodiment, the type of the reaction vessel is not particularly limited, and a reaction vessel which can be normally used for the ammonia synthesis reaction can be used. As a specific reaction form, for example, a batch type reaction form, a closed circulation system reaction form, a flow system reaction form, and the like can be used. From a practical viewpoint, a flow reaction type is preferable. Any of the following methods can be used: a method of connecting a single reactor filled with a catalyst or a plurality of reactors; or a method of using a reactor having a plurality of reaction layers in the same reactor.

Since the reaction for synthesizing ammonia from hydrogen and nitrogen is an exothermic reaction with volume shrinkage, heat of reaction is preferably removed industrially in order to increase the ammonia yield, and a known reactor with a commonly used heat removal means may be used. For example, a method may be used in which a plurality of reactors filled with a catalyst are connected in series and an intercooler is installed at the outlet of each reactor to remove heat.

Other Embodiments of Ammonia Synthesis Catalyst

[Ammonia Synthesis Catalyst Composed of Metal Oxyhydride Powder]

The metal oxyhydride powder obtained in the above embodiment can be used as a catalyst for ammonia synthesis without supporting a transition metal (not including a supporting metal). The metal oxyhydride powder is preferably a composition containing a metal oxyhydride represented by general formula (2).

$$AeLn_2O_{4-x}H_y \qquad (2)$$

In the above general formula (2), Ae is at least one alkaline earth metal selected from the group consisting of Mg, Ca, Ba, and Sr; x represents a number expressed by 0.1≤x≤3.0; and y represents a number expressed by 0.2≤y≤3.0. Preferably, x represents a number expressed by 0.1≤x≤1.5; and y represents a number expressed by 0.1≤y≤1.5. Further, y is preferably y≥0.1, more preferably y>0.5, and still more preferably y≥1.0.

The metal oxyhydride powder is preferably a composition containing a metal oxyhydride represented by general formula (11).

$$BaCe_2O_{4-x}H_y \qquad (11)$$

In the above general formula (11), x and y have the same meaning as in the general formula (1). In addition, preferably, x represents a number expressed by 0.2≤x≤1.5; and y represents a number expressed by 0.2≤y≤1.5.

[Ammonia Synthesis Using Metal Oxyhydride Powder]
<Ammonia Synthesis Reaction>

The ammonia synthesis reaction can be carried out under the same conditions as in the above embodiment. For example, as shown in Example 7 and FIG. 5 described later using $BaCe_2O_{4-x}H_y$ powder, the formation rate of ammonia at 400° C. and 0.9 MPa was 0.4 mmol/g/hr. The formation rate of ammonia at 500° C. and 0.9 MPa was 1.7 mmol/g/hr.

In the ammonia producing method of the present embodiment, the ammonia synthesis catalyst obtained by the producing method of the present embodiment may be used alone or in combination with other known catalysts that can normally be used for ammonia synthesis.

EXAMPLES

The present invention will now be described in more detail with reference to examples. The amount of $NH_3$ formed was determined by a gas chromatograph, or the formed $NH_3$ was dissolved in an aqueous sulfuric acid solution, and the amount of $NH_3$ contained in the sample was determined by an ion chromatograph using the obtained solution as a sample to determine the ammonia formation rate, and the ammonia synthesis activity was evaluated based on the obtained ammonia formation rate.

(Ion Chromatogram Analysis)

Ammonium ions ($NH_4^+$) captured by dissolving ammonia gas discharged from the reaction vessel in a 5 mM sulfuric acid aqueous solution were analyzed using an ion chromatograph. The analytical conditions are shown as follows.

[Measurement Conditions]
Equipment: Prominence manufactured by Shimadzu Corporation
Detector: Electrical conductivity detector CDD-10 Avp (manufactured by Shimadzu Corporation)
Colunm: IC-C4 for ion chromatography (manufactured by Shimadzu Corporation)
Eluent: 3.0 mM oxalic acid+2.0 mM 18-crown-6-ether aqueous solution, flow rate: 1.0 mL/min
Column temperature: 40° C.

Example 1

(Preparation of Catalyst for Ammonia Synthesis)
<Synthesis of Metal Oxyhydride $BaCe_2O_{4-x}H_y$ Powder>

Water and the like adsorbed on the surface of $CeO_2$ were removed by vacuum heating treatment at 600° C. The resulting dehydrated $CeO_2$ and $BaH_2$ were mixed in an Ar glove box using an agate mortar so that the molar ratio of Ce to Ba was 1:1. The powder of the resulting mixture was subjected to a heat treatment at 600° C. for 20 hours in a stream of $H_2$ to obtain red-brown powdered $BaCe_2O_{4-x}H_y$.

<Ru Support on $BaCe_2O_{4-x}H_y$>

The powdered $BaCe_2O_{4-x}H_y$ obtained by the above method of 0.50 g and $Ru_3(CO)_{12}$ (made by Aldrich, 99%) 0.056 g (equivalent to 5% by weight of the supported metal Ru for $BaCe_2O_{4-x}H_y$) were inserted into a silica glass tube, and were heated to 200° C. in a stream of hydrogen and nitrogen ($N_2$:$H_2$=1:3, flow rate: 8 ml/min) for 2 hours. Subsequently, the temperature was raised to 400° C. for 2 hours, and then was heated at 400° C. for 2 hours to obtain a metal-supported material on which Ru was fixed to $BaCe_2O_{4-x}H_y$ (hereinafter, Ru/$BaCe_2O_{4-x}H_y$).

Next, in the following example, ammonia synthesis was carried out using the obtained metal-supported material as a catalyst for ammonia synthesis.

[Ammonia Synthesis Using Ru-Supported $BaCe_2O_{4-x}H_y$]
<Ammonia Synthesis Reaction>

The Ru/$BaCe_2O_{4-x}H_y$ catalyst was used as a catalyst, and the catalyst was brought into contact with a mixed gas of nitrogen and hydrogen to carry out an ammonia synthesis reaction. The Ru/$BaCe_2O_{4-x}H_y$ (0.1 g) was packed in a SUS reaction tube, and the ammonia synthesis reaction was carried out using a fixed bed flow reactor equipped with the Ru/$BaCe_2O_{4-x}H_y$ reaction tube. The moisture concentration of the raw material nitrogen gas and the moisture concentration of the raw material hydrogen gas were both below the detection limit. At the time of this reaction, the flow rates of the two source gases were 15 mL/min for nitrogen and 45 mL/min for hydrogen (total 60 mL/min). In this reaction, the reaction pressure was 0.9 MPa, the reaction temperature was 300° C., and the reaction time was 30 hours.

<Ammonia Formation Rate>

Ammonia in the gas was dissolved in the aqueous solution of sulfuric acid by bubbling the gas discharged from the fixed bed flow type reactor into the aqueous solution of 0.005 M sulfuric acid, and the produced ammonium ion was determined by the method using an ion chromatograph. As a result of measuring the formation rate of ammonia formed by the ammonia synthesis reaction with time using an ion chromatograph, the ammonia formation rate was 5.66 mmol/g/hr. This value was much higher than that of Ru/$BaCeO_3$ (0.63 mmol/g/hr) obtained in Comparative Example 1 described later. The results are shown in Table 1.

Figure 4:
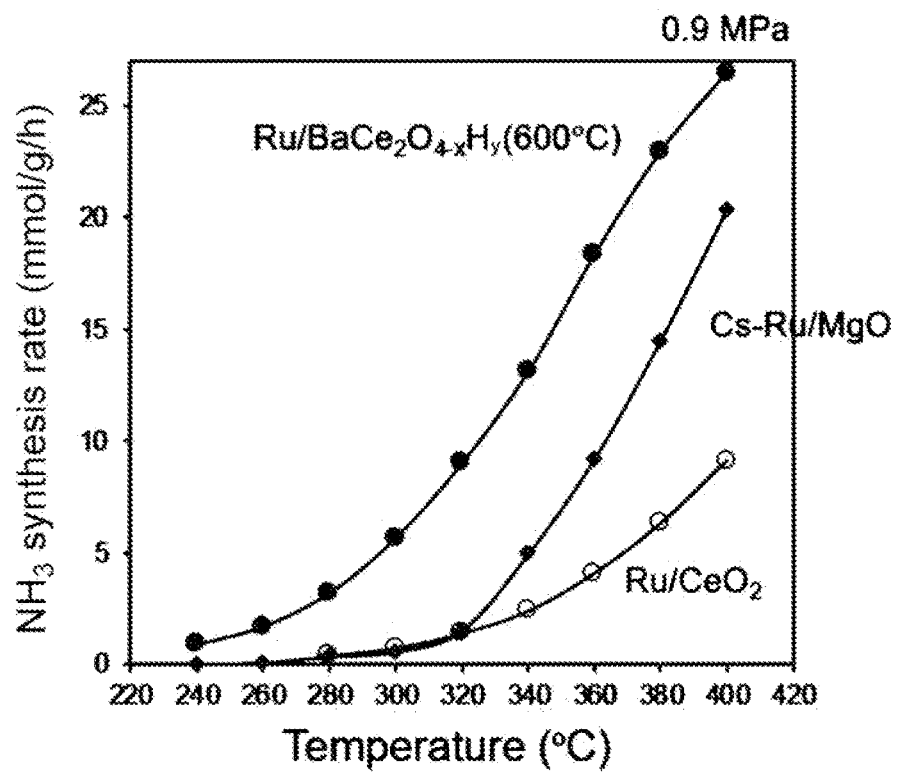
FIG. 4 is a graph showing the reaction temperature dependence of the ammonia formation rate in Example 1 and Comparative Examples 4 and 5.

The reaction temperature dependence of the ammonia formation rate was evaluated by carrying out a similar experiment by changing the reaction temperature of the ammonia synthesis reaction. The results are shown in FIG. 4.

Example 2

<Co Support on $BaCe_2O_{4-x}H_y$>

The powdered $BaCe_2O_{4-x}H_y$ obtained by the above method of 95 mg and $Co_2(CO)_8$ of 14.5 mg (equivalent to 5% by weight of supported metallic Co for $BaCe_2O_{4-x}H_y$) were placed in a quartz glass reaction tube, and the temperature was raised to 400° C. for 2 hours while flowing nitrogen of 15 mL/min and hydrogen of 45 mL/min (total of 60 mL/min). Then, by maintaining the temperature for 5 hours, a metal-supported material in which Co was fixed to $BaCe_2O_{4-x}H_y$ (hereinafter, Co/$BaCe_2O_{4-x}H_y$) was obtained.

Next, in the following example, ammonia synthesis was carried out using the obtained metal-supported material as a catalyst for ammonia synthesis.

Figure 5:
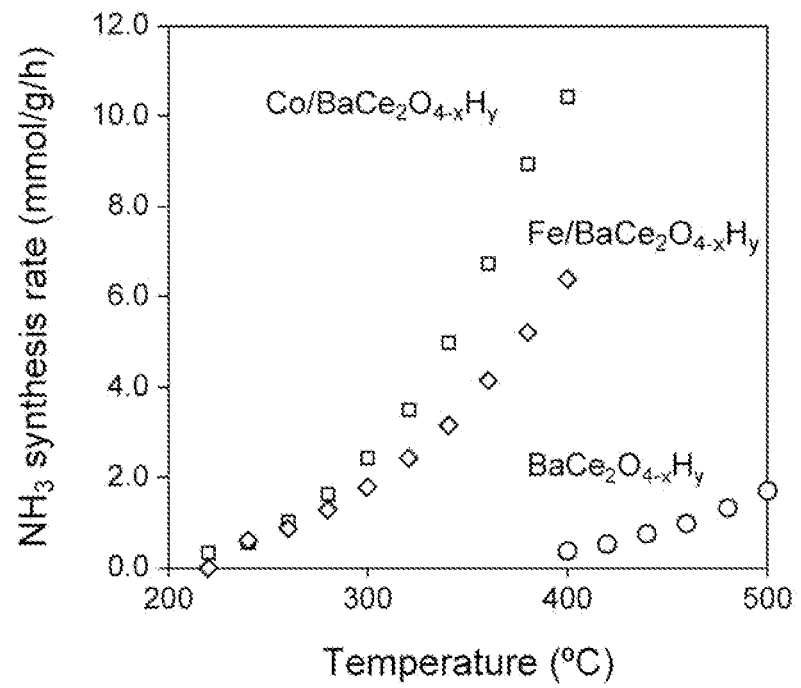
FIG. 5 is a graph showing the reaction temperature dependence of the ammonia formation rate in Examples 2, 3, and 7.

[Ammonia Synthesis Using Co-Supported $BaCe_2O_{4-x}H_y$]
<Ammonia Synthesis Reaction>
A reaction for producing ammonia ($NH_3$) (Ammonia synthesis reaction) was carried out in the same manner and under the same conditions as in Example 1, except that $Co/BaCe_2O_{4-x}H_y$ was used as a catalyst instead of $Ru/BaCe_2O_{4-x}H_y$ used in Example 1.
<Ammonia Formation Rate>
In the same manner as in Example 1, the formation rate of ammonia produced by the ammonia synthesis reaction was measured with time using an ion chromatograph, and as a result, the formation rate of ammonia was 2.43 mmol/g/hr. The results are shown in Table 1.
The reaction temperature dependence of the ammonia formation rate was evaluated by the same method as in Example 1. The results are shown in FIG. 5.

Example 3

<Fe Support on $BaCe_2O_{4-x}H_y$>
The powdered $BaCe_2O_{4-x}H_y$ obtained by the above method of 95 mg and $Fe_2(CO)_9$ of 16.3 mg (equivalent to 5% by weight of metal Fe supported on $BaCe_2O_{4-x}H_y$) were placed in a quartz glass reaction tube, and the temperature was raised to 400° C. for 2 hours while passing nitrogen of 15 mL/min and hydrogen of 45 mL/min (total of 60 mL/min) through the reaction tube. Then, by maintaining the temperature for 5 hours, a metal-supported material in which Fe was fixed to $BaCe_2O_{4-x}H_y$ (hereinafter, $Fe/BaCe_2O_{4-x}H_y$) was obtained. Next, in the following example, ammonia synthesis was carried out using the obtained metal-supported material as a catalyst for ammonia synthesis.
[Ammonia Synthesis Using Fe-Supported $BaCe_2O_{4-x}H_y$]
<Ammonia Synthesis Reaction>
A reaction for producing ammonia ($NH_3$) (Ammonia synthesis reaction) was carried out in the same manner and under the same conditions as in Example 1, except that $Fe/BaCe_2O_{4-x}H_y$ was used as a catalyst instead of $Ru/BaCe_2O_{4-x}H_y$ used in Example 1.
<Ammonia Formation Rate>
In the same manner as in Example 1, the formation rate of ammonia produced by the ammonia synthesis reaction was measured with time using an ion chromatograph, and as a result, the formation rate of ammonia was 1.78 mmol/g/hr. The results are shown in Table 1.
The reaction temperature dependence of the ammonia formation rate was evaluated by the same method as in Example 1. The results are shown in FIG. 5.

Comparative Example 1

<Synthesis of $BaCeO_3$ Powder>
5.23 g (0.02 mol) of barium nitrate and 8.68 g (0.02 mol) of cerium nitrate hexahydrate and 38.4 g (0.2 mol) of citric acid were dissolved in water. 42.4 g (0.4 mol) of diethylene glycol was added to the resulting aqueous solution, and the mixture was stirred for 1 hour. The resulting mixture was then gelled by heating at 120° C. for 4 hours. The resulting gelled product was then carbonized by heating at 450° C. for 5 hours. Powdery $BaCeO_3$ was prepared by heating the carbonized mixed powder at 900° C. for 6 hours.
<Ru Support on $BaCeO_3$>
Using the same method as in Example 1, the support $Ru/BaCeO_3$ was prepared by depositing metal Ru in an amount of 5 mass % relative to $BaCeO_3$.

Next, in the following example, ammonia synthesis was carried out using the obtained metal-supported material as a catalyst for ammonia synthesis.
<Ammonia Synthesis Reaction>
The ammonia synthesis reaction was carried out in the same manner and under the same conditions as in Example 1, except that $Ru/BaCeO_3$ was used as a catalyst instead of $Ru/BaCe_2O_{4-x}H_y$ used in Example 1.
<Ammonia Formation Rate>
In the same manner as in Example 1, the formation rate of ammonia formed by the ammonia synthesis reaction was measured with time using an ion chromatograph, and as a result, the formation rate of ammonia was 0.63 mmol/g/hr. The results are shown in Table 1.

Comparative Example 2

<Co Support on $BaCeO_3$>
Using the same method as in Comparative Example 1, the support $Co/BaCeO_3$ was prepared by depositing a metal Co in an amount of 5 mass % relative to $BaCeO_3$.
[Ammonia Synthesis Using $Co/BaCeO_3$]
<Ammonia Synthesis Reaction>
The ammonia synthesis reaction was carried out in the same manner and under the same conditions as in Example 1, except that $Co/BaCeO_3$ was used as the catalyst.
<Ammonia Formation Rate>
The formation rate of ammonia formed by the ammonia synthesis reaction was measured with time using an ion chromatograph by the same method as in Example 1, and the formation rate of ammonia was 0 mmol/g/hr. The results are shown in Table 1.

Comparative Example 3

<Fe Support on $BaCeO_3$>
Using the same method as in Comparative Example 1, a metal-supported material $Fe/BaCeO_3$ was prepared by depositing metal Fe in an amount of 5 mass % relative to $BaCeO_3$.
[Ammonia Synthesis Using $Fe/BaCeO_3$]
<Ammonia Synthesis Reaction>
The ammonia synthesis reaction was carried out in the same manner and under the same conditions as in Example 1, except that $Fe/BaCeO_3$ was used as the catalyst.
<Ammonia Formation Rate>
The formation rate of ammonia formed by the ammonia synthesis reaction was measured with time using an ion chromatograph by the same method as in Example 1, and the formation rate of ammonia was 0 mmol/g/hr. The results are shown in Table 1.

Comparative Example 4

<Ru Support on Cs/MgO>
A 5% by weight Cs—Ru/MgO catalyst (Cs/Ru element ratio=1) was prepared in the same manner as in Example 1, except that MgO in which Cs was added (designated as Cs/MgO) was used instead of $BaCe_2O_{4-x}H_y$ used in Example 1.
[Ammonia Synthesis Using Cs—Ru/MgO]
<Ammonia Synthesis Reaction>
The ammonia synthesis reaction was carried out by the same method and conditions as in Example 1. The formation rate of ammonia at 300° C. and 0.9 MPa was 0.55 mmol/g/hr. The results are shown in Table 1.

The reaction temperature dependence of the ammonia formation rate was evaluated by the same method and conditions as in Example 1. The results are shown in FIG. 4.

Comparative Example 5

<Ru Support on CeO2
A 5% by weight Ru/CeO$_2$ catalyst was prepared in the same manner as in Example 1, except that CeO$_2$ was used instead of BaCe$_2$O$_{4-x}$H$_y$ used in Example 1.
[Ammonia Synthesis Using Ru/CeO$_2$]
<Ammonia Synthesis Reaction>
The ammonia synthesis reaction was carried out by the same method and conditions as in Example 1. The formation rate of ammonia at 300° C. and 0.9 MPa was 0.72 mmol/g/hr. The results are shown in Table 1.
The reaction temperature dependence of the ammonia formation rate was evaluated by the same method and conditions as in Example 1. The results are shown in FIG. 4.

Comparative Example 6

[Support of Ru on C12A7:e$^-$]
A 2% by weight Ru/C12A7:e$^-$ catalyst was prepared by the same method as in Example 1, except that C12A7:e$^-$ was used instead of BaCe$_2$O$_{4-x}$H$_y$ used in Example 1.
[Ammonia Synthesis Using C12A7:e$^-$]
<Ammonia Synthesis Reaction>
The ammonia synthesis reaction was carried out by the same method and conditions as in Example 1. The formation rate of ammonia at 300° C. and 0.9 MPa was 0.76 mmol/g/hr. The results are shown in Table 1.

Comparative Example 7

<Ru Support on Ca$_2$N>
A 5% by weight Ru/Ca$_2$N catalyst was prepared in the same manner as in Example 1, except that Ca$_2$N was used instead of BaCe$_2$O$_{4-x}$H$_y$ used in Example 1.
[Synthesis of Ammonia Using Ru/Ca$_2$N]
<Ammonia Synthesis Reaction>
The ammonia synthesis reaction was carried out by the same method and conditions as in Example 1. The formation rate of ammonia at 300° C. and 0.9 MPa was 1.74 mmol/g/hr. The results are shown in Table 1.

Examples 4 to 6

Figure 2:
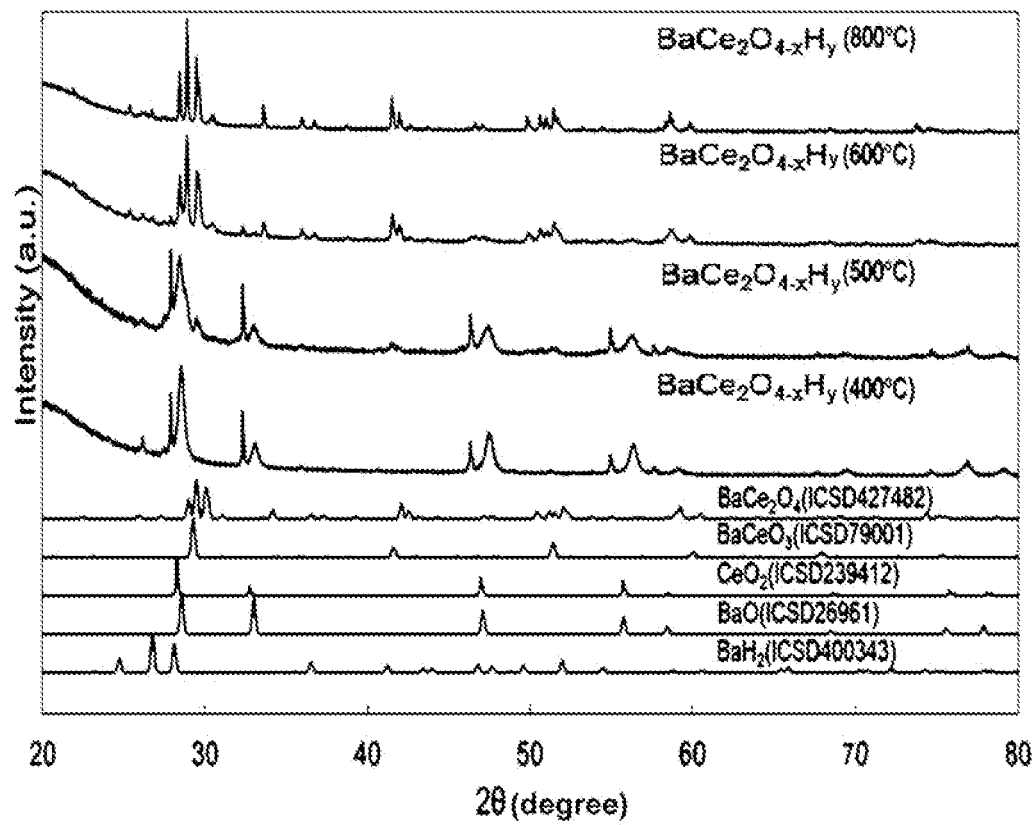
FIG. 2 is an XRD diffraction pattern of the metal oxyhydride $BaCe_2O_{4-x}H_y$ powder obtained in Examples 1, 4, 5, and 6.
Figure 3:
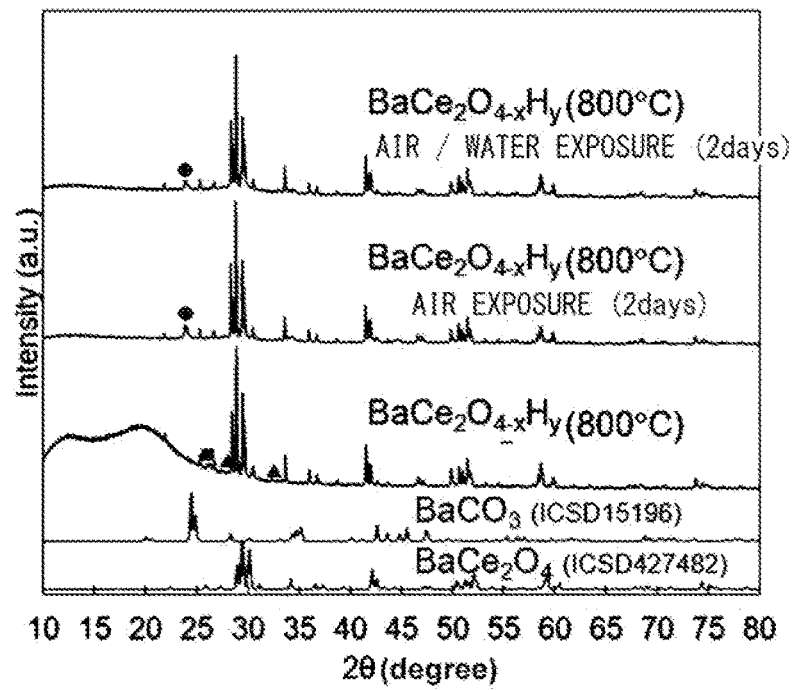
FIG. 3 is a diffraction pattern of the metal oxyhydride $BaCe_2O_{4-x}H_y$ powder obtained in Example 4 before and after exposure to air and water.
Figure 6:
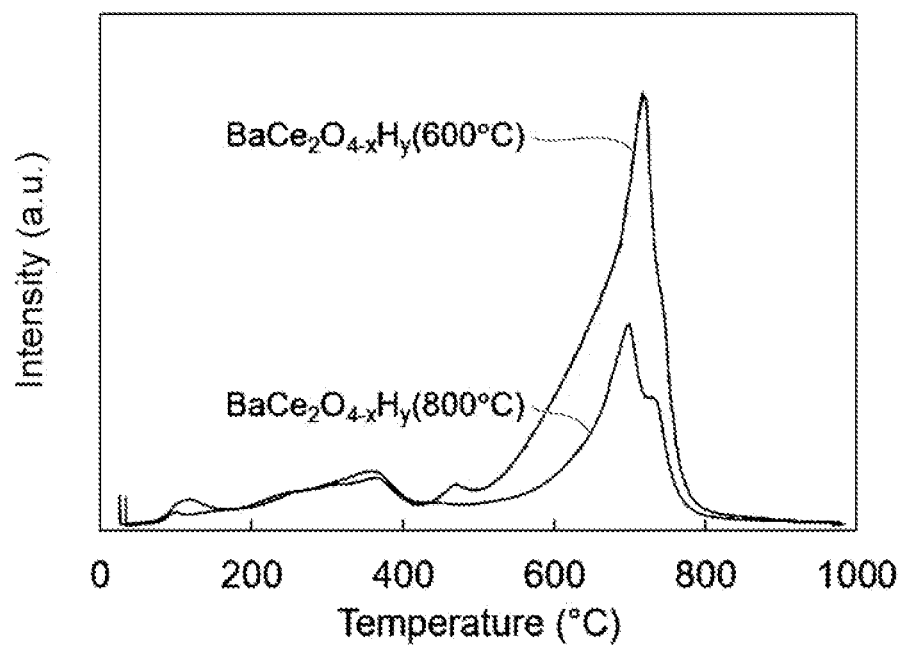
FIG. 6 is a temperature-programmed desorption spectrum of hydrogen from the metal oxyhydride $BaCe_2O_{4-x}H_y$ obtained in Examples 1 and 4.

<Evaluation of BaCe$_2$O$_{4-x}$H$_y$ Powders Synthesized at Different Temperatures>
BaCe$_2$O$_{4-x}$H$_y$ powder was prepared in the same manner as in Example 1, except that the heat treatment temperatures shown in Table 2 were used instead of the heat treatment temperature of 600° C. in the hydrogen stream set in Example 1.
<XRD of BaCe$_2$O$_{4-x}$H$_y$ Powder>
The XRD diffraction patterns of the samples synthesized in Examples 1 and 4 to 6 by the method described above are shown in FIG. 2. In the sample synthesized at a temperature lower than 600° C., a diffraction pattern in which multiple peaks were mixed was observed, and a single-phase sample was not obtained. On the other hand, in the sample synthesized at 600° C. or higher, it was found from the observed diffraction pattern that a material of a single phase which is almost the same as that of BaCe$_2$O$_4$ was obtained. In all the samples synthesized by this method, the peak shifted to the lower angle side in comparison with BaCe$_2$O$_4$. This may be due to the presence of hydrogen with a large ionic radius at the oxygen side of BaCe$_2$O$_4$. Furthermore, when the BaCe$_2$O$_{4-x}$H$_y$ powder synthesized in Example 4 was stored in air or water for 2 days, it was found that the XRD diffraction pattern did not change at all and the sample color (reddish brown) was also maintained (FIG. 3). The material was found to be an oxyhydride stable in water and air.
<Determination of Hydrogen in BaCe$_2$O$_{4-x}$H$_y$>
FIG. 6 shows the result of analyzing BaCe$_2$O$_{4-x}$H$_y$ synthesized at 600° C. (Example 1) and 800° C. (Example 4) via a temperature-programmed desorption analyzer (BEL-CATA). Desorption of hydrogen was observed from around 100° C., showing a maximum value at around 700° C., and desorption of hydrogen was observed up to around 800° C. The samples synthesized at 600° C. and 800° C. from the amount of desorbed hydrogen can be expressed as BaCe$_2$O$_{3.33}$H$_{1.34}$ and BaCe$_2$O$_{3.62}$H$_{0.76}$, respectively (provided that the oxidation number of all Ce is set to trivalent). (Since the oxidation number of all Ce is trivalent, the maximum value of oxygen is considered to be 3. In addition, considering the balance of electric charges, the sample can be expressed as BaCe$_2$O$_3$H$_{1.34}$e$_{1.67}$ and BaCe$_2$O$_3$H$_{0.76}$e$_{1.38}$, respectively, provided that electrons exist on the anion sites. It is considered that there are two possibilities, one of which is for the existence of these electrons in isolation or another of which is for the decrease in the valence of Ce or Ba.)
<Ru Support on BaCe$_2$O$_{4-x}$H$_y$>
A support in which Ru was fixed to BaCe$_2$O$_{4-x}$H$_y$ (hereinafter, Ru/BaCe$_2$O$_{4-x}$H$_y$) was obtained by the same method as in Example 1, except that powdered BaCe$_2$O$_{4-x}$H$_y$ obtained in Examples 4 to 6 was used instead of BaCe$_2$O$_{4-x}$H$_y$ used in Example 1.
[Ammonia Synthesis Using Ru/BaCe$_2$O$_{4-x}$H$_y$]
<Ammonia Synthesis Reaction>
The ammonia synthesis reaction was carried out in the same manner and under the same conditions as in Example 1, except that Ru/BaCe$_2$O$_{4-x}$H$_y$ used in Example 4 was used as a catalyst. Incidentally, in both Example 5 and Example 6, since the BaCe$_2$O$_{4-x}$H$_y$ used contained many impurities, its catalytic activity was not investigated.
<Ammonia Formation Rate>
In the same manner as in Example 1, the formation rate of ammonia produced by the ammonia synthesis reaction was measured with time using an ion chromatograph, and as a result, the formation rate of ammonia was 1.15 mmol/g/hr. The ammonia formation rate in Example 4 was slower than that in Example 1.

Example 7

[Ammonia Synthesis Catalyst Composed of BaCe$_2$O$_{4-x}$H$_y$ Powder]
The powder of BaCe$_2$O$_{4-x}$H$_y$ obtained in Example 1 was used as a catalyst for ammonia synthesis without supporting a transition metal (not including a supported metal).
[Ammonia Synthesis Using BaCe$_2$O$_{4-x}$H$_y$ Powder]
<Ammonia Synthesis Reaction>
The ammonia synthesis reaction was carried out in the same manner and under the same conditions as in Example 1, except that 400° C. was used. The formation rate of ammonia at 400° C. and 0.9 MPa was 0.4 mmol/g/hr. The reaction temperature dependence of the ammonia formation rate was evaluated by the same method and conditions as in Example 1. The results are shown in FIG. 5.

TABLE 1

| Catalyst | | Catalytic activity (NH$_3$ Formation rate) (mmol/g/h) |
|---|---|---|
| Example 1 | Ru/BaCe$_2$O$_{4-x}$H$_y$ | 5.66 |
| Example 2 | Co/BaCe$_2$O$_{4-x}$H$_y$ | 2.43 |
| Example 3 | Fe/BaCe$_2$O4$_{-x}$H$_y$ | 1.78 |
| Comparative Example 1 | Ru/BaCeO$_3$ | 0.63 |
| Comparative Example 2 | Co/BaCeO$_3$ | 0 |
| Comparative Example 3 | Fe/BaCeO$_3$ | 0 |
| Comparative Example 4 | Cs—Ru/MgO | 0.55 |
| Comparative Example 5 | Ru/CeO$_2$ | 0.72 |
| Comparative Example 6 | Ru(2% by weight)/C12A7:e$^-$ | 0.76 |
| Comparative Example 7 | Ru/Ca$_2$NH | 1.74 |

The reaction conditions of the Examples and Comparative Examples in Table 1 are as follows.

Amount of catalyst: 0.1 g, Reaction temperature: 300° C., Reaction gas flow rate: 60 mL/min, Reaction gas composition: N$_2$/H$_2$=1/3 (v/v), Reaction pressure: 0.9 MPa.

TABLE 2

| | Heat treatment temperature for synthesis of BaCe$_2$O$_{4-x}$H$_y$ powder (° C.) |
|---|---|
| Example 1 | 600 |
| Example 4 | 800 |
| Example 5 | 500 |
| Example 6 | 400 |

Example 8

<Synthesis of Ba$_2$SiO$_{4-x}$H$_y$ Powder>

The SiO$_2$ was subjected to a vacuum heating treatment at 600° C. to remove water and the like adsorbed on the surface. The resulting dehydrated SiO$_2$ and BaH$_2$ were mixed in an Ar glove box using an agate mortar so that the molar ratio of Si to Ba was 1:2. The powder of the resulting mixture was subjected to a heat treatment at 650° C. for 20 hours in a stream of H$_2$ to obtain Ba$_2$SiO$_{4-x}$H$_y$ in the form of black powder.

<XRD of Ba$_2$SiO$_{4-x}$H$_y$ Powder>

Figure 7:
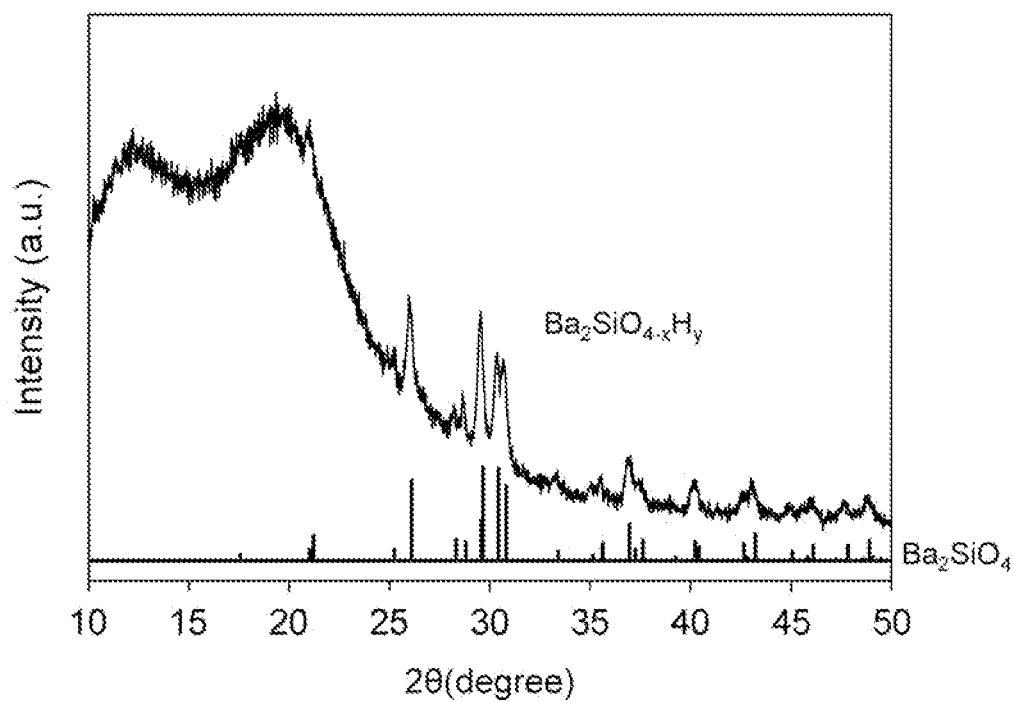
FIG. 7 is an XRD diffraction pattern of the metal oxyhydride $Ba_2SiO_{4-x}H_y$ powder obtained in Example 8.

The XRD diffraction pattern of the sample synthesized using the above method is shown in FIG. 7. From the observed diffraction patterns, it was found that a single-phase material which is almost the same as that of Ba$_2$SiO$_4$ was obtained in this sample. It was also found that the peaks of the samples synthesized by this method were shifted to the lower angle side in comparison with those of Ba$_2$SiO$_4$. It is considered that it is due to the formation of Si having a lower valence than that of Si$^{4+}$ and the increase in the ionic radius.

<Determination of Hydrogen in Ba$_2$SiO$_{4-x}$H$_y$>

Figure 8:
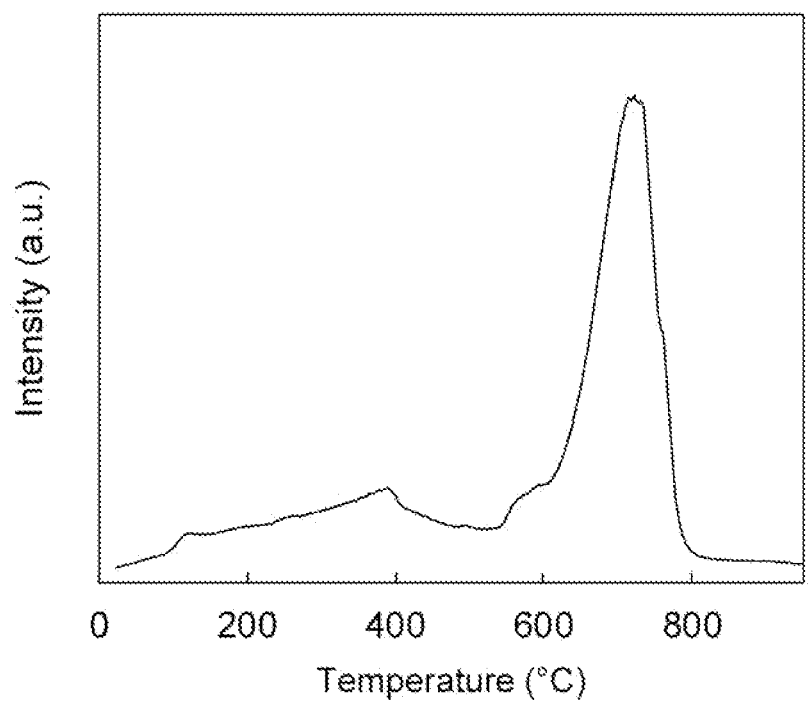
FIG. 8 is a temperature-programmed desorption spectrum of hydrogen from the metal oxyhydride $Ba_2SiO_{4-x}H_y$ obtained in Example 8.

The synthesized Ba$_2$SiO$_{4-x}$H$_y$ was analyzed by a temperature-programmed desorption analyzer (BELCATA), and the results are shown in FIG. 8. Desorption of hydrogen was observed from around 50° C., showing a maximum value at around 730° C., and desorption of hydrogen was observed up to around 800° C. The sample synthesized from the amount of desorbed hydrogen can be expressed as Ba$_2$SiO$_{2.66}$H$_{2.68}$ (provided that the oxidation number of all Si is set to be quadrivalent). (Since the raw material is SiO$_2$, the maximum value of oxygen is considered to be 2. In addition, provided that an electron is assumed to exist at the anion site in view of the balance of charges, it can be expressed as Ba$_2$SiO$_2$H$_{2.68}$ e$_{1.32}$. It is considered that there are two possibilities, one of which is for the existence of these electrons in isolation or another of which is for the decrease in the valence of Si or Ba.)

<Ru Support on Ba$_2$SiO$_{4-x}$H$_y$>

The powdered Ba$_2$SiO$_{4-x}$H$_y$ obtained by the above method of 0.50 g and Ru$_3$(CO)$_{12}$ (made by Aldrich, 99%) 0.056 g (equivalent to 5 mass % of Ba$_2$SiO$_{4-x}$H$_y$ as supported metal Ru) were inserted into a silica glass tube, and were heated to 200° C. in a stream of hydrogen and nitrogen (N$_2$:H$_2$=1:3, flow rate: 8 ml/min) for 2 hours. Subsequently, the temperature was raised to 400° C. for 2 hours, and then was heated at 400° C. for 2 hours to obtain a metal-supported material in which Ru was fixed to Ba$_2$SiO$_{4-x}$H$_y$ (hereinafter, Ru/Ba$_2$SiO$_{4-x}$H$_y$).

Next, in the following example, ammonia synthesis was carried out using the obtained metal-supported material as a catalyst for ammonia synthesis.

[Ammonia Synthesis Using Ru-Supported Ba$_2$SiO$_{4-x}$H$_y$]

<Ammonia Synthesis Reaction>

The Ru/Ba$_2$SiO$_{4-x}$H$_y$ catalyst was used as a catalyst, and the catalyst was brought into contact with a mixed gas of nitrogen and hydrogen to carry out an ammonia synthesis reaction. The Ru/Ba$_2$SiO$_{4-x}$H$_y$ of 0.1 g was packed in a SUS reaction tube, and the ammonia synthesis reaction was carried out using a fixed bed flow reactor equipped with the Ru/Ba$_2$SiO$_{4-x}$H$_y$ reaction tube. The moisture concentration of the raw material nitrogen gas and the moisture concentration of the raw material hydrogen gas were both below the detection limit. At the time of this reaction, the flow rates of the two source gases were 15 mL/min for nitrogen and 45 mL/min for hydrogen (total 60 mL/min). In this reaction, the reaction pressure was 0.9 MPa, the reaction temperature was 300° C., and the reaction time was 30 hours.

<Ammonia Formation Rate>

Ammonia in the gas was dissolved in the aqueous solution of sulfuric acid by bubbling the gas discharged from the fixed bed flow type reactor into the aqueous solution of 0.005 M sulfuric acid, and the produced ammonium ion was determined by the method using an ion chromatograph. As a result of measuring the formation rate of ammonia formed by the ammonia synthesis reaction with time using an ion chromatograph, the ammonia formation rate was 10.95 mmol/g/hr. The results are shown in Table 3.

TABLE 3

| Catalyst | | Catalytic activity (NH$_3$ Formation rate) (mmol/g/h) |
|---|---|---|
| Example 8 | Ru/Ba$_2$SiO$_{4-x}$H$_y$ | 10.95 |
| Example 9 | Ru/BaAl$_2$O$_{4-x}$H$_y$ | 2.20 |
| Example 10 | Ru/BaTiO$_{3-x}$H$_y$ | 3.67 |
| Example 11 | Ru/BaZrO$_{3-x}$H$_y$ | 3.73 |
| Example 12 | Ru/SrZrO$_{3-x}$H$_y$ | 3.56 |

The reaction conditions of the Examples in Table 3 are as follows.

Amount of catalyst: 0.1 g, Reaction temperature: 300° C., Reaction gas flow rate: 60 mL/min, Reaction gas composition: N$_2$/H$_2$=1/3 (v/v), Reaction pressure: 0.9 MPa.

Example 9

<Synthesis of $BaAl_2O_{4-x}H_y$ Powder>

By subjecting $Al_2O_3$ to a vacuum heating treatment at 600° C., water or the like adsorbed on the surface was removed. The obtained dehydrated $Al_2O_3$ and $BaH_2$ were mixed in an Ar glove box using an agate mortar so that the molar ratio of Al to Ba was 2:1. The powder of the resulting mixture was subjected to a heat treatment at 800° C. for 20 hours in a stream of $H_2$ to obtain black powdery $BaAl_2O_{4-x}H_y$.

<XRD of $BaAl_2O_{4-x}H_y$ Powder>

Figure 9:
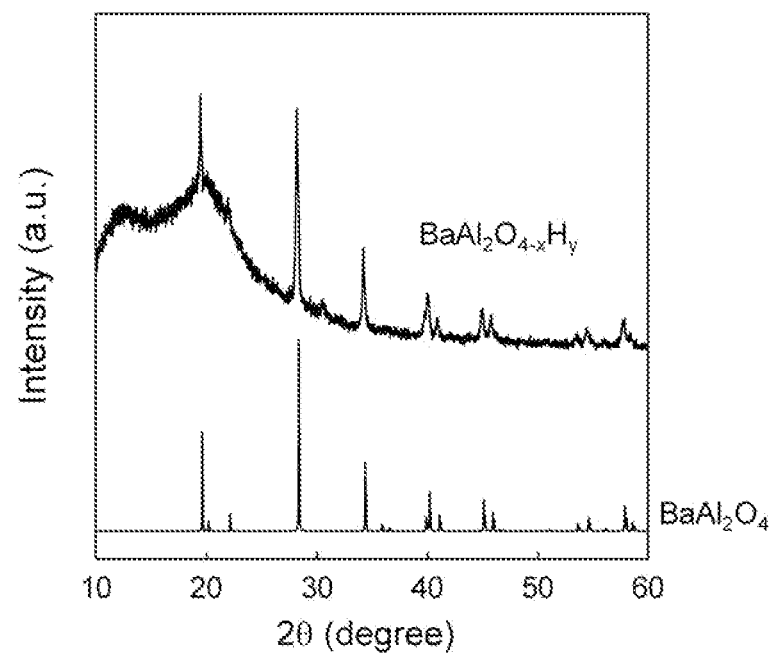
FIG. 9 is an XRD diffraction pattern of the metal oxyhydride $BaAl_2O_{4-x}H_y$ powder obtained in Example 9.

The XRD diffraction pattern of the sample synthesized using the above method is shown in FIG. 9. From the observed diffraction pattern, it was found that the sample had almost the same single phase as $BaAl_2O_4$. In all samples synthesized by this method, the peak shifted to the lower angle side compared with $BaAl_2O_4$. This is considered to be due to the formation of Al with a lower valence number than that of $Al^{3+}$ and the increase in the ionic radius.

<Determination of Hydrogen in $BaAl_2O_{4-x}H_y$

Figure 10:
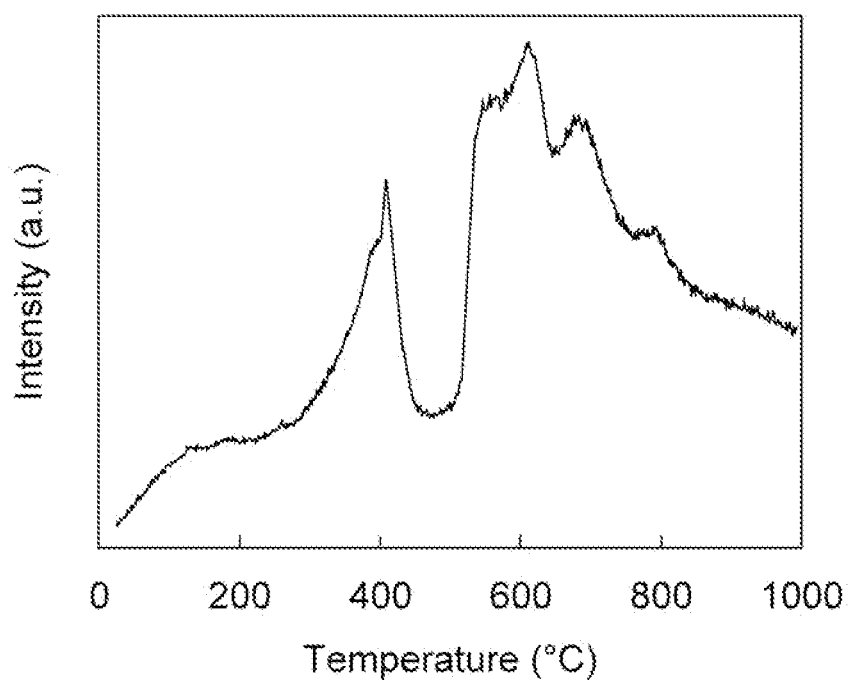
FIG. 10 is a temperature-programmed desorption spectrum of hydrogen from the metal oxide hydride $BaAl_2O_{4-x}H_y$ obtained in Example 9.

The synthesized $BaAl_2O_{4-x}H_y$ was analyzed by a temperature-programmed desorption (BELCATA) analyzer, and the results are shown in FIG. 10. Desorption of hydrogen was observed from around 50° C., showing a maximum value at around 600° C., and desorption of hydrogen was observed up to around 1000° C. The sample synthesized from the amount of desorbed hydrogen can be expressed as $BaAl_2O_{3.89}H_{0.22}$ (provided that the oxidation number of all Al is set to trivalent). (Since the raw material is $Al_2O_3$, the maximum value of oxygen is considered to be 3. Provided that electrons exist on the anion site in view of the balance of charges, it can also be expressed as $BaAl_2O_3H_{0.22}e_{1.78}$. It is considered that there are two possibilities, one of which is for the existence of these electrons in isolation or another of which is for the decrease in the valence of Al or Ba.)

<Ru Support on $BaAl_2O_{4-x}H_y$>

The powdered $BaAl_2O_{4-x}H_y$ 0.50 g obtained by the above method and $Ru_3(CO)_{12}$ (made by Aldrich, 99%) 0.056 g (equivalent to 5 mass % of the supported metal Ru for $BaAl_2O_{4-x}H_y$) were inserted into a silica glass tube, and were heated to 200° C. in a stream of hydrogen and nitrogen ($N_2:H_2=1:3$, flow rate: 8 ml/min) for 2 hours. Subsequently, the temperature was raised to 400° C. for 2 hours, and then was heated at 400° C. for 2 hours to obtain a metal-supported material (hereinafter, Ru/$BaAl_2O_{4-x}H_y$) in which Ru was fixed to $BaAl_2O_{4-x}H_y$.

Next, in the following example, ammonia synthesis was carried out using the selected metal-supported material as a catalyst for ammonia synthesis.

[Ammonia Synthesis Using Ru-Supported $BaAl_2O_{4-x}H_y$]

<Ammonia Synthesis Reaction>

The Ru/$BaAl_2O_{4-x}H_y$ catalyst was used as a catalyst, and the catalyst was brought into contact with a mixed gas of nitrogen and hydrogen to carry out an ammonia synthesis reaction. The Ru/$BaAl_2O_{4-x}H_y$ of 0.1 g was packed in a SUS reaction tube, and the ammonia synthesis reaction was carried out using a fixed bed flow reactor equipped with the Ru/$BaAl_2O_{4-x}H_y$ reaction tube. The moisture concentration of the raw material nitrogen gas and the moisture concentration of the raw material hydrogen gas were both below the detection limit. At the time of this reaction, the flow rates of the two source gases were 15 mL/min for nitrogen and 45 mL/min for hydrogen (total 60 mL/min). In this reaction, the reaction pressure was 0.9 MPa, the reaction temperature was 300° C., and the reaction time was 30 hours.

<Ammonia Formation Rate>

Ammonia in the gas was dissolved in the aqueous solution of sulfuric acid by bubbling the gas discharged from the fixed bed flow type reactor into the aqueous solution of 0.005 M sulfuric acid, and the produced ammonium ion was determined by the method using an ion chromatograph. As a result of measuring the formation rate of ammonia formed by the ammonia synthesis reaction with time using an ion chromatograph, the ammonia formation rate was 2.20 mmol/g/hr. The results are shown in Table 3.

Example 10

<Synthesis of $BaTiO_{3-x}H_y$ Powder>

Water and the like adsorbed on the surface were removed by subjecting $TiO_2$ to a vacuum heating treatment at 600° C. The selected dehydrated $TiO_2$ and $BaH_2$ were mixed in an Ar glove box using an agate mortar so that the molar ratio of Ti to Ba was 1:1. The powder of the resulting mixture was subjected to a heat treatment at 800° C. for 20 hours in a stream of $H_2$ to obtain black powdery $BaTiO_{3-x}H_y$.

<XRD of $BaTiO_{3-x}H_y$ Powder>

Figure 11:
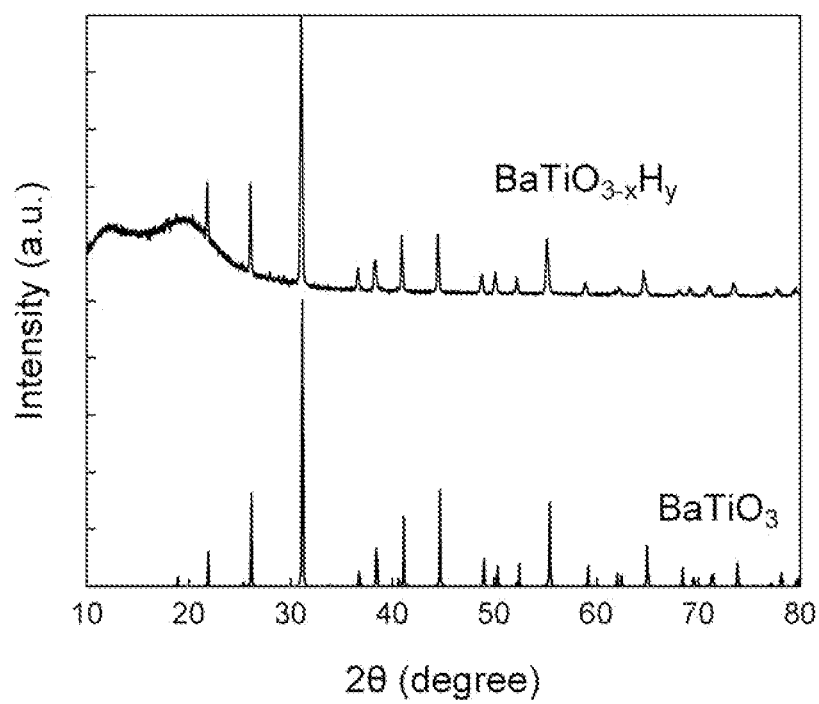
FIG. 11 is an XRD diffraction pattern of the metal oxyhydride $BaTiO_{3-x}H_y$ powder obtained in Example 10.

The XRD diffraction pattern of the sample synthesized using the above method is shown in FIG. 11. The observed diffraction patterns of the samples showed that almost the same single-phase material as $BaTiO_3$ could be obtained. It was also found that the peaks of all the samples synthesized by this method shifted to the lower angle side compared with $BaTiO_3$. This is considered to be due to the formation of Ti having a lower valence than that of $Ti^{4+}$ and the increase in the ionic radius.

<Determination of Hydrogen in $BaTiO_{3-x}H_y$

Figure 12:
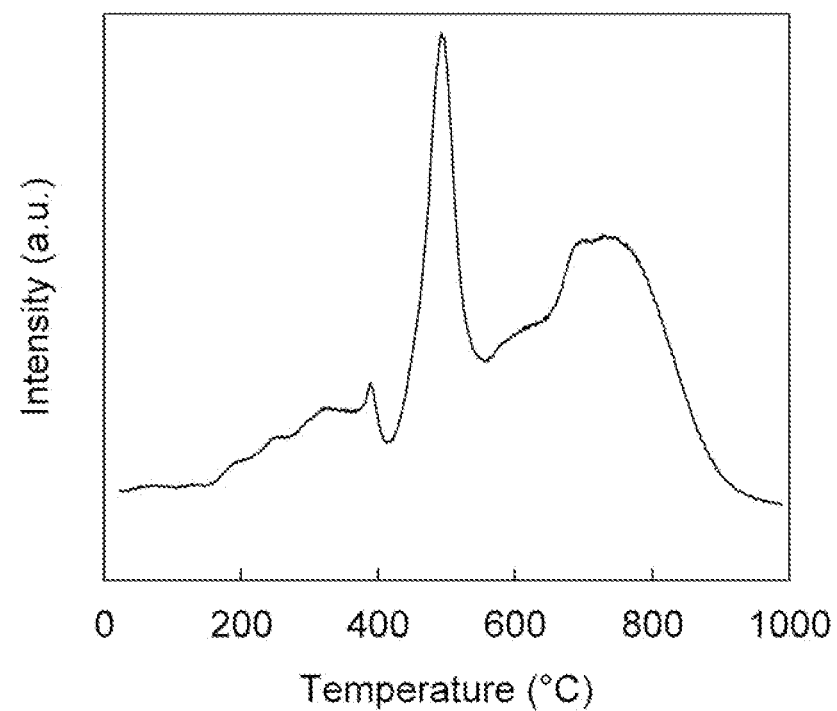
FIG. 12 is a temperature-programmed desorption spectrum of hydrogen from the metal oxide hydride $BaTiO_{3-x}H_y$ obtained in Example 10.

The synthesized $BaTiO_{3-x}H_y$ was analyzed by the thermal desorption analysis (BELCATA), and the results are shown in FIG. 12. Desorption of hydrogen was observed from around 150° C., showing a maximum value at around 500° C., and desorption of hydrogen was observed up to around 950° C. The sample synthesized from the amount of desorbed hydrogen can be expressed as $BaTiO_{2.33}H_{1.33}$ (the oxidation number of all the Ti is set to be quadrivalent). This indicates that hydride ions are introduced at higher concentrations than those reported by Kageyama Group (Non-Patent Documents 1 to 2) ($BaTiO_{2.5}H_{0.5}$). (Since the raw material is $TiO_2$, the maximum value of oxygen is considered to be 2. In addition, $BaTiO_2H_{1.33}e_{0.67}$ can also be used if it is assumed that electrons exist on the anion site in view of the balance of charges. It is speculated that there are two possibilities, one of which is that the electrons are isolated and another of which is that the valence of Ti or Ba decreases.)

<Ru Support on $BaTiO_{3-x}H_y$>

The powdered $BaTiO_{3-x}H_y$ 0.50 g and $Ru_3(CO)_{12}$ (made by Aldrich, 99%) 0.056 g (equivalent to 5% by weight of supported metal Ru for $BaTiO_{3-x}H_y$) obtained by the above method were inserted into a silica glass tube, and were heated to 200° C. in a stream of hydrogen and nitrogen ($N_2:H_2=1:3$, flow rate: 8 ml/min) for 2 hours. Subsequently, the temperature was raised to 400° C. for 2 hours, and then was heated at 400° C. for 2 hours to obtain a metal-supported material (hereinafter, Ru/$BaTiO_{3-x}H_y$) in which Ru was fixed to $BaTiO_{3-x}H_y$.

Next, in the following example, ammonia synthesis was carried out using the selected metal-supported material as a catalyst for ammonia synthesis.

[Ammonia Synthesis Using Ru-Supported $BaTiO_{3-x}H_y$]

<Ammonia Synthesis Reaction>

The Ru/$BaTiO_{3-x}H_y$ catalyst was used as a catalyst, and the catalyst was brought into contact with a mixed gas of nitrogen and hydrogen to carry out an ammonia synthesis reaction. The Ru/BaTiO$_{3-x}$H$_y$ of 0.1 g was packed in a SUS reaction tube, and the ammonia synthesis reaction was carried out using a fixed bed flow reactor equipped with the Ru/BaTiO$_{3-x}$H$_y$ reaction tube. The moisture concentration of the raw material nitrogen gas and the moisture concentration of the raw material hydrogen gas were both below the detection limit. At the time of this reaction, the flow rates of the two source gases were 15 mL/min for nitrogen and 45 mL/min for hydrogen (total 60 mL/min). In this reaction, the reaction pressure was 0.9 MPa, the reaction temperature was 300° C., and the reaction time was 30 hours.

<Ammonia Formation Rate>

Ammonia in the gas was dissolved in the aqueous solution of sulfuric acid by bubbling the gas discharged from the fixed bed flow type reactor into the aqueous solution of 0.005 M sulfuric acid, and the produced ammonium ion was determined by the method using an ion chromatograph. As a result of measuring the formation rate of ammonia formed by the ammonia synthesis reaction with time using an ion chromatograph, the ammonia formation rate was 3.67 mmol/g/hr. The results are shown in Table 3.

Example 11

<Synthesis of BaZrO$_{3-x}$H$_y$ Powder>

The ZrO$_2$ was subjected to a vacuum heating treatment at 600° C. to remove water and the like adsorbed on the surface. The obtained dehydrated ZrO$_2$ and BaH$_2$ were mixed in an Ar glove box using an agate mortar so that the molar ratio of Zr to Ba was 1:1. The powder of the resulting mixture was subjected to a heat treatment at 800° C. for 20 hours in a stream of H$_2$ to obtain black powdery BaZrO$_{3-x}$H$_y$.

<XRD of BaZrO$_{3-x}$H$_y$ Powder>

Figure 13:
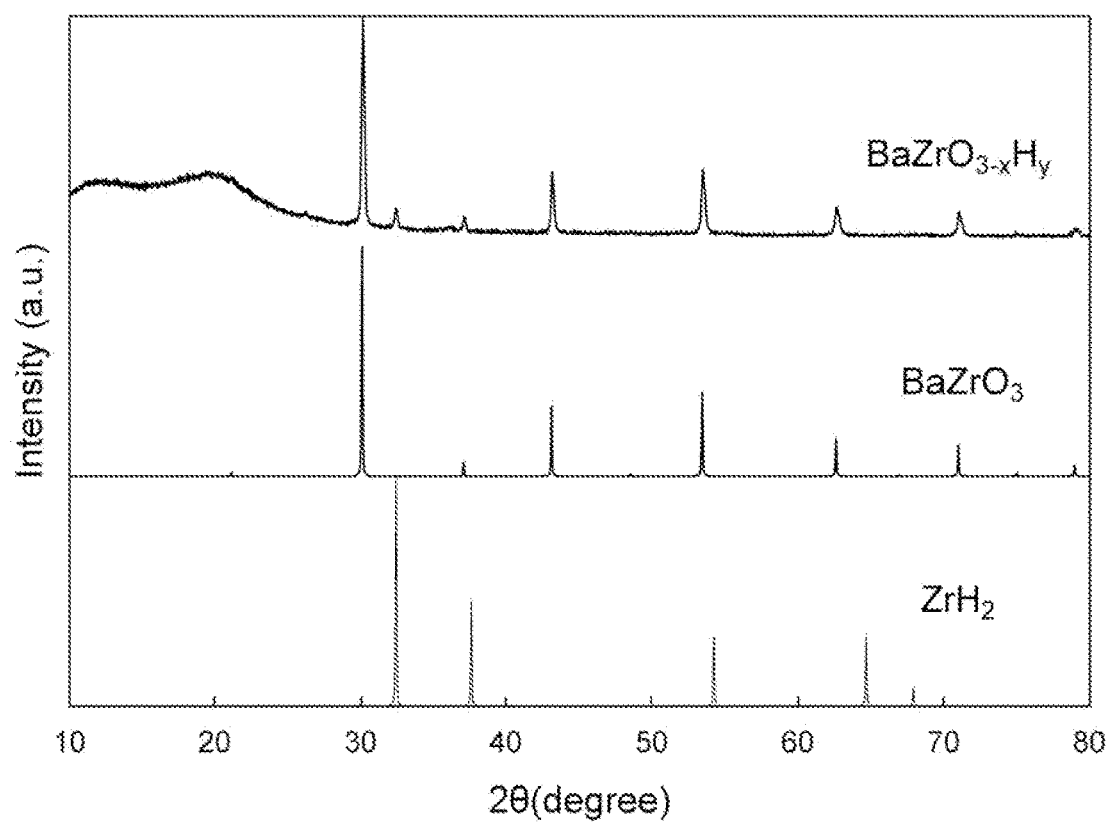
FIG. 13 is an XRD diffraction pattern of the metal oxide hydride $BaZrO_{3-x}H_y$ powder obtained in Example 11.
Figure 14:
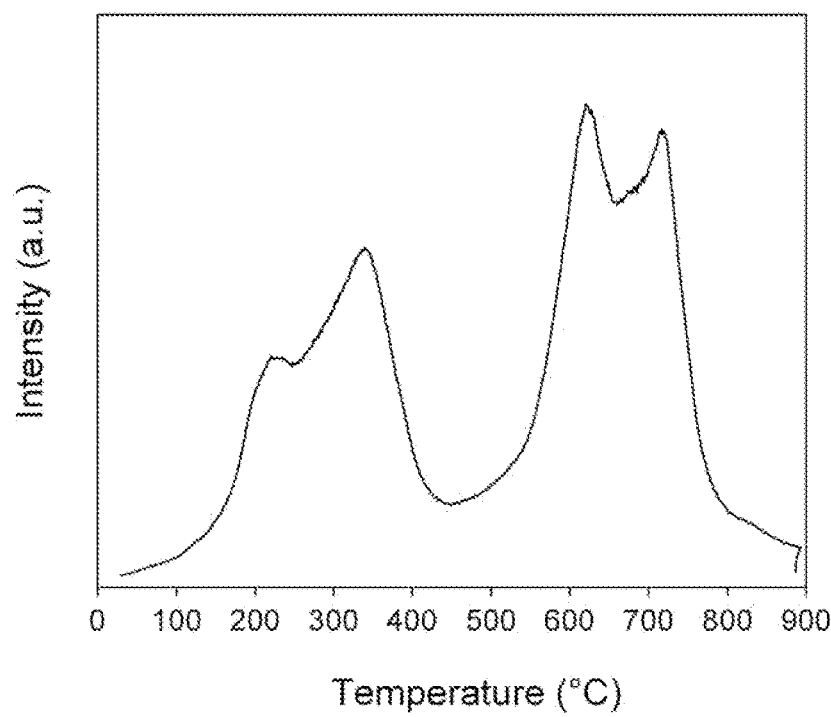
FIG. 14 is a temperature-programmed desorption spectrum of hydrogen from the metal oxide hydride $BaZrO_{3-x}H_y$ obtained in Example 11.

The XRD diffraction pattern of the sample synthesized using the above method is shown in FIG. 13. It was found from the observed diffraction pattern that the sample had almost the same single-phase material as BaZrO$_3$. However, it was found that ZrH$_2$ was formed as an impurity. It was also found that the peak of all samples synthesized by this method shifted to a slightly higher angle side compared with BaZrO$_3$. The reason for this is not well understood.

<Determination of Hydrogen in BaZrO$_{3-x}$H$_y$>

The results of the analysis of the synthesized BaZrO$_{3-x}$H$_y$ by the thermal desorption analysis (BELCATA) are shown in FIG. 12. Desorption of hydrogen was observed from around 50° C., showing a maximum value at around 600° C., and desorption of hydrogen was observed up to around 1000° C. The sample synthesized from the amount of desorbed hydrogen can be denoted as BaZrO$_{2.19}$H$_{1.62}$ (provided that the oxidation number of all Zr is set to be quadrivalent). (Since the raw material is ZrO$_2$, the maximum value of oxygen is considered to be 2. In addition, when it is assumed that electrons exist on the anion site in view of the balance of electric charges, it can be also expressed as ZrO$_2$H$_{1.62}$e$_{0.38}$. It is considered that there are two possibilities, one of which is for the existence of these electrons in isolation or another of which is for the decrease in the valence of Zr and Ba.)

Support of Ru on BaZrO$_{3-x}$H$_y$

The powdered BaZrO$_{3-x}$H$_y$ obtained by the above method of 0.50 g and Ru$_3$(CO)$_{12}$ (made by Aldrich, 99%) 0.056 g (equivalent to 5% by weight of supported metal Ru for BaZrO$_{3-x}$H$_y$) were inserted into a silica glass tube, and were heated to 200° C. in a stream of hydrogen and nitrogen (N$_2$:H$_2$=1:3, flow rate: 8 ml/min) for 2 hours. Subsequently, the temperature was raised to 400° C. for 2 hours, and then was heated at 400° C. for 2 hours to obtain a metal-supported material in which Ru was fixed to BaZrO$_{3-x}$H$_y$ (hereinafter, Ru/BaZrO$_{3-x}$H$_y$).

Next, in the following example, ammonia synthesis was carried out using the obtained metal-supported material as a catalyst for ammonia synthesis.

[Ammonia Synthesis Using Ru-Supported BaZrO$_{3-x}$H$_y$]

<Ammonia Synthesis Reaction>

The Ru/BaZrO$_{3-x}$H$_y$ catalyst was used as a catalyst, and the catalyst was brought into contact with a mixed gas of nitrogen and hydrogen to carry out an ammonia synthesis reaction. The Ru/BaZrO$_{3-x}$H$_y$ of 0.1 g was packed in a SUS reaction tube, and the ammonia synthesis reaction was carried out using a fixed bed flow reactor equipped with the Ru/BaZrO$_{3-x}$H$_y$ reaction tube. The moisture concentration of the raw material nitrogen gas and the moisture concentration of the raw material hydrogen gas were both below the detection limit. At the time of this reaction, the flow rates of the two source gases were 15 mL/min for nitrogen and 45 mL/min for hydrogen (total 60 mL/min). In this reaction, the reaction pressure was 0.9 MPa, the reaction temperature was 300° C., and the reaction time was 30 hours.

<Ammonia Formation Rate>

Ammonia in the gas was dissolved in the aqueous solution of sulfuric acid by bubbling the gas discharged from the fixed bed flow type reactor into the aqueous solution of 0.005 M sulfuric acid, and the produced ammonium ion was determined by the method using an ion chromatograph. As a result of measuring the formation rate of ammonia formed by the ammonia synthesis reaction with time using an ion chromatograph, the ammonia formation rate was 3.73 mmol/g/hr. The results are shown in Table 3.

Example 12

<Synthesis of SrZrO$_{3-x}$H$_y$ Powder>

The ZrO$_2$ was subjected to a vacuum heating treatment at 600° C. to remove water and the like adsorbed on the surface. The obtained dehydrated ZrO$_2$ and SrH$_2$ were mixed in an Ar glove box using an agate mortar so that the molar ratio of Zr to Sr was 1:1. The powder of the resulting mixture was subjected to a heat treatment at 800° C. for 20 hours in a stream of H$_2$ to obtain black powder SrZrO$_{3-x}$H$_y$.

<XRD of SrZrO$_{3-x}$H$_y$ Powder>

Figure 15:
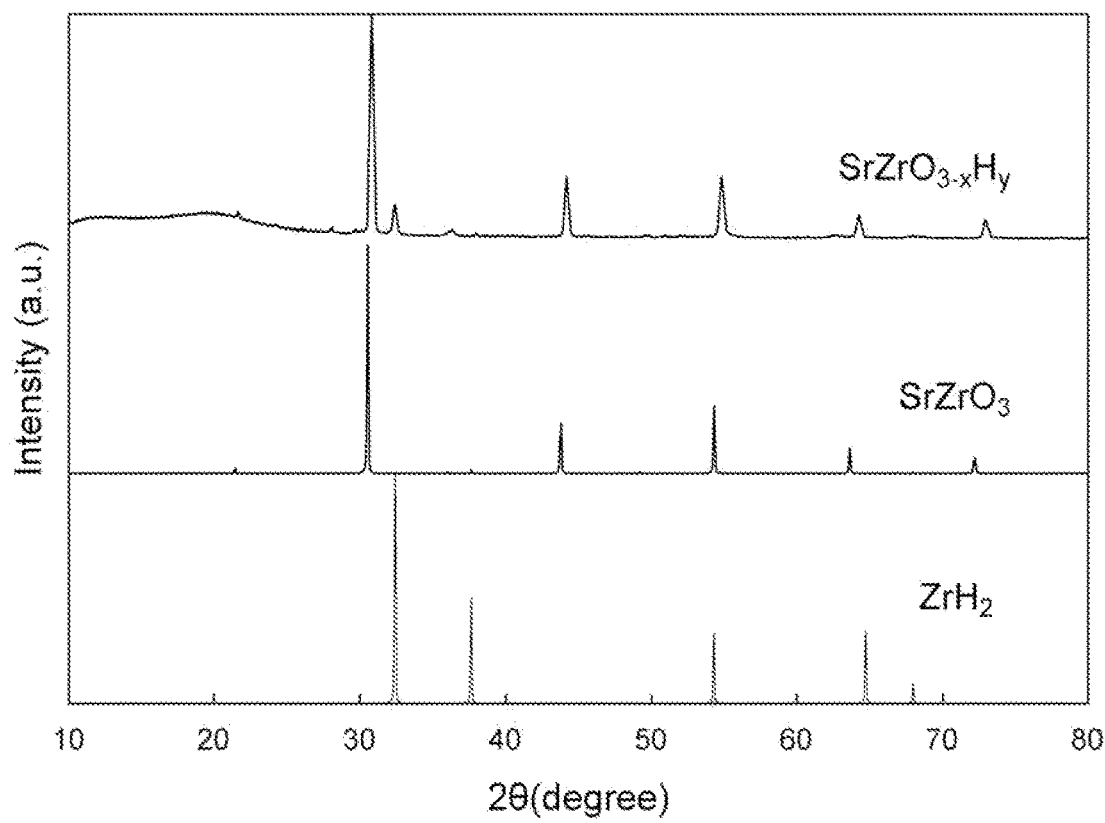
FIG. 15 is an XRD diffraction pattern of the metal oxide hydride $SrZrO_{3-x}H_y$ powder obtained in Example 12.

The XRD diffraction pattern of the sample synthesized using the above method is shown in FIG. 15. From the observed diffraction pattern, it was found that a single-phase material similar to that of SrZrO$_3$ was obtained in this sample. However, it was found that ZrH$_2$ was formed as an impurity. It was also found that the peak of all samples synthesized by this method shifted to a slightly higher angle side compared with SrZrO$_3$. The reason for this is not well understood.

<Determination of Hydrogen in SrZrO$_{3-x}$H$_y$>

Figure 16:
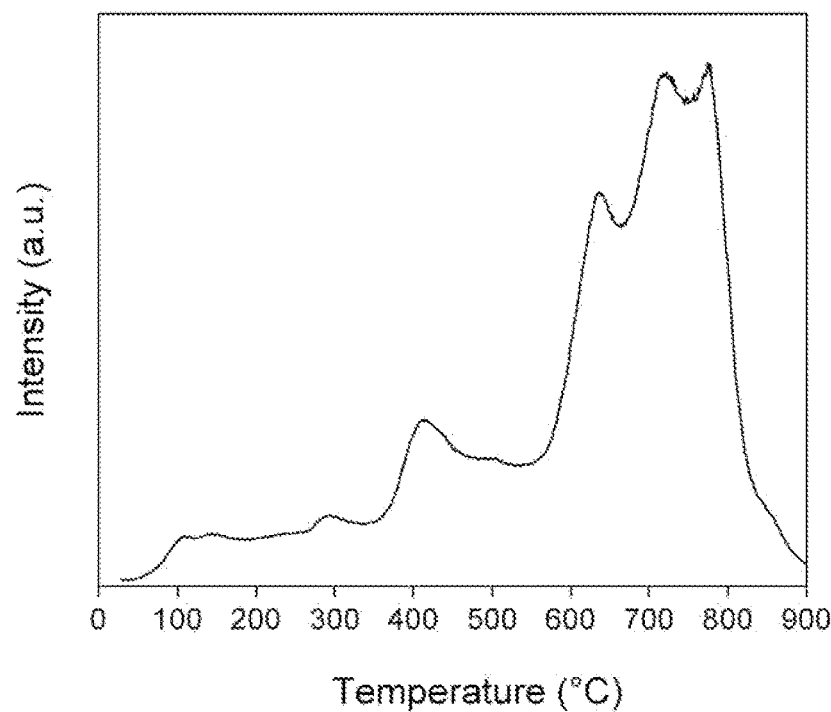
FIG. 16 is a temperature-programmed desorption spectrum of hydrogen from the metal oxide hydride $SrZrO_{3-x}H_y$ obtained in Example 12.

The results of analysis of the synthesized BaZrO$_{3-x}$H$_y$ by the thermal desorption analysis (BELCATA) are shown in FIG. 16 (during data acquisition). Desorption of hydrogen was observed from around 50° C., showing a maximum value at around 700 to 800° C., and desorption of hydrogen was observed up to around 1000° C. The sample synthesized from the amount of desorbed hydrogen can be expressed as SrZrO$_{2.07}$H$_{1.86}$ (provided that the oxidation number of all Zr is set to be quadrivalent). (Since the raw material is ZrO$_2$, the maximum value of oxygen is considered to be 2. In addition, when an electron is assumed to exist on the anion site in view of the balance of electric charges, it can be expressed as SrZrO$_2$H$_{1.86}$e$_{0.13}$. It is considered that there are two possibilities, one of which is for the existence of these electrons in isolation or another of which is for the decrease in the valence of Zr and Ba.)

<Ru Support on SrZrO$_{3-x}$H$_y$>

The powdered SrZrO$_{3-x}$H$_y$ obtained by the above method of 0.50 g and Ru$_3$(CO)$_{12}$ (made by Aldrich, 99%) 0.056 g (equivalent to 5 mass % of SrZrO$_{3-x}$H$_y$ as supported metal Ru) were inserted into a silica glass tube, and were heated to 200° C. in a stream of hydrogen and nitrogen (N$_2$:H$_2$=1:3, flow rate: 8 ml/min) for 2 hours. Subsequently, the temperature was raised to 400° C. for 2 hours, and then was heated at 400° C. for 2 hours to obtain a metal-supported material (hereinafter, Ru/BaZrO$_{3-x}$H$_y$) in which Ru was fixed to SrZrO$_{3-x}$H$_y$.

Next, in the following example, ammonia synthesis was carried out using the obtained metal-supported material as a catalyst for ammonia synthesis.

[Ammonia Synthesis Using Ru-Supported SrZrO$_{3-x}$H$_y$]

<Ammonia Synthesis Reaction>

The Ru/SrZrO$_{3-x}$H$_y$ catalyst was used as a catalyst, and the catalyst was brought into contact with a mixed gas of nitrogen and hydrogen to carry out an ammonia synthesis reaction. 0.1 g of Ru/SrZrO$_{3-x}$H$_y$ was packed in a SUS reaction tube, and the ammonia synthesis reaction was carried out using a fixed bed flow reactor equipped with the Ru/SrZrO$_{3-x}$H$_y$ reaction tube. The moisture concentration of the raw material nitrogen gas and the moisture concentration of the raw material hydrogen gas were both below the detection limit. At the time of this reaction, the flow rates of the two source gases were 15 mL/min for nitrogen and 45 mL/min for hydrogen (total 60 mL/min). In this reaction, the reaction pressure was 0.9 MPa, the reaction temperature was 300° C., and the reaction time was 30 hours.

<Ammonia Formation Rate>

Ammonia in the gas was dissolved in the aqueous solution of sulfuric acid by bubbling the gas discharged from the fixed bed flow type reactor into the aqueous solution of 0.005 M sulfuric acid, and the produced ammonium ion was determined by the method using an ion chromatograph. As a result of measuring the formation rate of ammonia formed by the ammonia synthesis reaction with time using an ion chromatograph, the ammonia formation rate was 3.56 mmol/g/hr. The results are shown in Table 3.

What is claimed is:

1. A method of producing a metal oxyhydride by reacting an oxide with a metal hydride in a hydrogen atmosphere, wherein
a pressure condition of the reaction is 0.1 to 0.9 MPa;
a temperature of the reaction is 500 to 1000° C.;
the oxide is M$_m$O$_n$,
wherein M is the non-oxygen element and m is 1 or 2; n represents a number of 2 or 3, and
M$_m$O$_n$ is selected from the group consisting of Sc$_2$O$_3$, Y$_2$O$_3$, LnO$_2$, ZrO$_2$, TiO$_2$, SiO$_2$, and Al$_2$O$_3$;
the metal hydride is AeH$_2$,
wherein Ae is an alkaline earth metal selected from the group consisting of Mg, Ca, Ba, and Sr; and
the metal oxyhydride is a metal oxyhydride represented by general formula (1),

$$Ae_rM_pO_{q-x}H_y \qquad (1)$$

wherein Ae is at least one alkaline earth metal selected from the group consisting of Mg, Ca, Ba, and Sr; M is a non-oxygen element selected from the group consisting of Sc, Y, Ln, Zr, Ti, Si, and Al; r is 1 or 2; p is 1 or 2; q is 3 or 4; x represents a number expressed by 0.1≤x≤3.0; and y represents a number expressed by 0.2≤y≤3.0.

2. The method according to claim 1, the method comprising:
mixing the oxide with the metal hydride to obtain a mixture; and
heating the mixture in a hydrogen atmosphere at a pressure of 0.1 to 0.9 MPa and at a temperature of 500 to 1000° C.

3. The method according to claim 2, further comprising a pretreatment step of dehydrating the oxide prior to the mixing step.

4. The method according to claim 1,
wherein the metal hydride is BaH$_2$, and
in the general formula (1), Ae is Ba.

5. The method according to claim 1,
wherein a feed molar ratio of the oxide to the metal hydride is from p: 0.5r to p: 2.5r.

* * * * *